(12) United States Patent
Schultz-Amling et al.

(10) Patent No.: US 9,196,257 B2
(45) Date of Patent: Nov. 24, 2015

(54) APPARATUS AND A METHOD FOR CONVERTING A FIRST PARAMETRIC SPATIAL AUDIO SIGNAL INTO A SECOND PARAMETRIC SPATIAL AUDIO SIGNAL

(75) Inventors: Richard Schultz-Amling, Nuremberg (DE); Fabian Kuech, Erlangen (DE); Markus Kallinger, Erlangen (DE); Giovanni Del Galdo, Martinroda (DE); Oliver Thiergart, Forchheim (DE); Dirk Mahne, Nuremberg (DE); Achim Kuntz, Hemhofen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 314 days.

(21) Appl. No.: 13/523,085

(22) Filed: Jun. 14, 2012

(65) Prior Publication Data

US 2013/0016842 A1 Jan. 17, 2013

Related U.S. Application Data

(63) Continuation of application No. PCT/EP2010/069669, filed on Dec. 14, 2010.

(60) Provisional application No. 61/287,596, filed on Dec. 17, 2009.

(30) Foreign Application Priority Data

Mar. 11, 2010 (EP) ..................................... 10156263

(51) Int. Cl.
H04R 5/02 (2006.01)
G10L 19/008 (2013.01)

(Continued)

(52) U.S. Cl.
CPC .............. *G10L 19/008* (2013.01); *H04N 5/232* (2013.01); *H04N 5/782* (2013.01); *H04S 7/302* (2013.01);

(Continued)

(58) Field of Classification Search
CPC ... H04S 5/00; H04S 2420/01; H04S 2400/11; H04S 7/30; H04S 2400/01; H04S 7/302
USPC ..................................................... 381/17, 310
See application file for complete search history.

(56) References Cited

U.S. PATENT DOCUMENTS 4,984,087 A * 1/1991 Fujimura et al. .............. 348/348
2002/0151996 A1 10/2002 Wilcock et al.

(Continued)

FOREIGN PATENT DOCUMENTS

EP 1473971 11/2004
EP 1589754 10/2005

(Continued)

OTHER PUBLICATIONS

Kallinger, et al., "A Spatial Filtering Approach for Directional Audio Coding", AES Convention 126, May 2009.

(Continued)

*Primary Examiner* — Alexander Jamal
(74) *Attorney, Agent, or Firm* — Michael A. Glenn; Perkins Coie LLP

(57) ABSTRACT

An apparatus for converting a first parametric spatial audio signal representing a first listening position or a first listening orientation in a spatial audio scene to a second parametric spatial audio signal representing a second listening position or a second listening orientation is described, the apparatus including: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change.

6 Claims, 9 Drawing Sheets

(51) Int. Cl.
- *H04N 5/232* (2006.01)
- *H04N 5/782* (2006.01)
- *H04S 7/00* (2006.01)
- *G10L 19/16* (2013.01)
- *H04S 1/00* (2006.01)
- *H04S 3/00* (2006.01)

(52) U.S. Cl.
CPC .............. *G10L 19/173* (2013.01); *H04S 1/007* (2013.01); *H04S 3/008* (2013.01); *H04S 2400/11* (2013.01); *H04S 2400/15* (2013.01); *H04S 2420/03* (2013.01)

(56) References Cited

U.S. PATENT DOCUMENTS

| | | | |
|---|---|---|---|
| 2004/0228498 | A1 | 11/2004 | Sekine |
| 2005/0237395 | A1 | 10/2005 | Takenaka et al. |
| 2006/0045276 | A1 | 3/2006 | Gamo |
| 2006/0133618 | A1 | 6/2006 | Villemoes et al. |
| 2006/0233379 | A1 | 10/2006 | Villemoes et al. |
| 2007/0127733 | A1 | 6/2007 | Henn et al. |
| 2007/0189551 | A1 | 8/2007 | Kimijima |
| 2008/0298597 | A1* | 12/2008 | Turku et al. ............ 381/27 |
| 2008/0298610 | A1 | 12/2008 | Virolainen et al. |
| 2009/0006106 | A1 | 1/2009 | Pang et al. |
| 2009/0043591 | A1 | 2/2009 | Breebaart et al. |
| 2009/0299756 | A1 | 12/2009 | Davis et al. |
| 2010/0191537 | A1 | 7/2010 | Breebaart |
| 2013/0158993 | A1* | 6/2013 | Wilcock et al. ............ 704/235 |

FOREIGN PATENT DOCUMENTS

| | | |
|---|---|---|
| JP | H03-114000 | 5/1991 |
| JP | H07-288899 | 10/1995 |
| JP | H07-312712 | 11/1995 |
| JP | H09-121400 | 5/1997 |
| JP | 2002-207488 | 7/2002 |
| JP | 2003-244800 | 8/2003 |
| JP | 2003-284196 | 10/2003 |
| JP | 2004-312355 | 11/2004 |
| JP | 2005-311604 | 11/2005 |
| JP | 2006-050241 | 2/2006 |
| JP | 2006-074386 | 3/2006 |
| JP | 2007-201818 | 8/2007 |
| JP | 2007-533221 | 11/2007 |
| JP | 2009-524104 | 6/2009 |
| TW | 200643897 | 4/1995 |
| TW | 200939865 | 10/1995 |
| TW | 200742275 | 3/1996 |
| TW | 200922365 | 6/1997 |
| WO | WO-2008113428 | 9/2008 |
| WO | WO-2009/039897 | 4/2009 |

OTHER PUBLICATIONS

Pulkki, V., "Spatial Sound Reproduction with Directional Audio Coding", Journal of the Audio Engineering Society, NY, NY, vol. 55, No. 6, Jun. 1, 2007, pp. 503-516.

Pulkki, V. "Virtual Sound Source Positioning Using Vector Base Amplitude Panning", Journal of the Audio Engineering Society, NY, NY, vol. 45, No. 6, Jun. 1, 1996, pp. 456-466.

* cited by examiner

APPARATUS AND A METHOD FOR CONVERTING A FIRST PARAMETRIC SPATIAL AUDIO SIGNAL INTO A SECOND PARAMETRIC SPATIAL AUDIO SIGNAL

CROSS-REFERENCE TO RELATED APPLICATIONS

This application is a continuation of copending International Application No. PCT/EP2010/069669, filed Dec. 14, 2010, which is incorporated herein by reference in its entirety, and additionally claims priority from US. Patent Application No. 61/287,596, filed Dec. 17, 2009, and European Patent Application No. 10156263.5, filed Mar. 11, 2010, which are all incorporated herein by reference in their entirety.

BACKGROUND OF THE INVENTION

The present invention relates to the field of audio processing, especially to the field of parametric spatial audio processing and for converting a first parametric spatial audio signal into a second parametric spatial audio signal.

Spatial sound recording aims at capturing a sound field with multiple microphones such that at the reproduction side, a listener perceives the sound image, as it was present at the recording location. Standard approaches for spatial sound recording use simple stereo microphones or more sophisticated combinations of directional microphones, e.g., such as the B-format microphones used in Ambisonics and described by M. A. Gerzon, "Periphony: Width-Height Sound Reproduction," J. Aud. Eng. Soc., Vol. 21, No. 1, pp 2-10, 1973, in the following referred to as [Ambisonics]. Commonly, these methods are referred to as coincident-microphone techniques.

Alternatively, methods based on a parametric representation of sound fields can be applied, which are referred to as parametric spatial audio coders. These methods determine a downmix audio signal together with corresponding spatial side information, which are relevant for the perception of spatial sound. Examples are Directional Audio Coding (DirAC), as discussed in Pulkki, V., "Directional audio coding in spatial sound reproduction and stereo upmixing," in Proceedings of The AES 28th International Conference, pp. 251-258, Piteå, Sweden, Jun. 30-Jul. 2, 2006, in the following referred to as [DirAC], or the so-called spatial audio microphones (SAM) approach proposed in Faller, C., "Microphone Front-Ends for Spatial Audio Coders", in Proceedings of the AES 125th International Convention, San Francisco, October 2008, in the following referred to as [SAM]. The spatial cue information basically consists of the direction-of-arrival (DOA) of sound and the diffuseness of the sound field in frequency subbands. In a synthesis stage, the desired loudspeaker signals for reproduction are determined based on the downmix signal and the parametric side information.

In other words, the downmix signals and the corresponding spatial side information represent the audio scene according to the set-up, e.g. the orientation and/or position of the microphones, in relation to the different audio sources used at the time the audio scene was recorded.

SUMMARY

According to an embodiment, an apparatus for converting a first parametric spatial audio signal representing a first listening position or a first listening orientation in a spatial audio scene to a second parametric spatial audio signal representing a second listening position or a second listening orientation may have: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change, wherein the first parametric spatial audio signal includes a downmix signal, a direction-of-arrival parameter and a diffuseness parameter, and wherein the second parametric spatial audio signal includes a downmix signal, a direction-of-arrival parameter and a diffuseness parameter.

According to another embodiment, a system may have: an inventive apparatus; and a video camera, wherein the apparatus is coupled to the video camera and is adapted to receive a video rotation or a video zoom signal as a control signal.

According to another embodiment, a method for converting a first parametric spatial audio signal representing a first listening position or a first listening orientation in a spatial audio scene to a second parametric spatial audio signal representing a second listening position or a second listening orientation may have the steps of: modifying the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change; wherein the first parametric spatial audio signal includes a downmix signal, a direction-of-arrival parameter and a diffuseness parameter, and wherein the second parametric spatial audio signal includes a downmix signal, a direction-of-arrival parameter and a diffuseness parameter.

Another embodiment may have a computer program having a program code for performing the inventive method when the program runs on a computer.

According to another embodiment, an apparatus for converting a first parametric spatial audio signal representing a first listening position or a first listening orientation in a spatial audio scene to a second parametric spatial audio signal representing a second listening position or a second listening orientation may have: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change; wherein the spatial audio signal modification unit includes a parameter modification unit adapted to modify a first directional parameter of the first parametric spatial audio signal so as to obtain a second directional parameter of the second parametric spatial audio signal depending on a control signal providing information corresponding to the change; and wherein the control signal is a translation control signal defining a translation in direction of the first listening orientation, wherein the parameter modification unit is adapted to obtain the second directional parameter using a non-linear mapping function defining the second directional parameter depending on the first directional parameter and the translation defined by the control signal.

According to another embodiment, an apparatus for converting a first parametric spatial audio signal representing a first listening position or a first listening orientation in a spatial audio scene to a second parametric spatial audio signal representing a second listening position or a second listening orientation may have: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change; wherein the spatial audio signal modification unit includes a parameter modification unit adapted to modify a first directional parameter of the first parametric spatial audio signal so as to obtain a second directional parameter of the second parametric spatial audio signal depending on a control signal providing information corresponding to the change; and wherein the control signal is a zoom control signal defining a zoom factor in direction of the first listening orientation, wherein the parameter modification unit is adapted to obtain the second directional parameter using a non-linear mapping function defining the second directional parameter depending on the first directional parameter and the zoom factor defined by the zoom control signal.

According to another embodiment, an apparatus for converting a first parametric spatial audio signal representing a first listening position or a first listening orientation in a spatial audio scene to a second parametric spatial audio signal representing a second listening position or a second listening orientation may have: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change; wherein the spatial audio signal modification unit includes a parameter modification unit adapted to modify a first directional parameter of the first parametric spatial audio signal so as to obtain a second directional parameter of the second parametric spatial audio signal depending on a control signal providing information corresponding to the change; wherein the spatial audio signal modification unit includes a downmix modification unit adapted to modify a first downmix audio signal of the first parametric spatial audio signal to obtain a second downmix signal of the second parametric spatial audio signal depending on the first directional parameter and/or a first diffuseness parameter, or a downmix modification unit adapted to modify the first downmix audio signal of the first parametric spatial audio signal to obtain the second downmix signal of the second parametric spatial audio signal depending on the second directional parameter and/or a first diffuseness parameter; wherein the downmix modification unit is adapted to derive a direct component from the first downmix audio signal and a diffuse component from the first downmix audio signal dependent on the first diffuseness parameter; wherein the downmix modification unit is adapted to obtain the second downmix signal based on a combination of a direction dependent weighted version of the direct component and a direction dependent weighted version of the diffuse component; wherein the downmix modification unit is adapted to produce the direction dependent weighted version of the direct component by applying a first direction dependent function to the direct component, the first direction dependent function being adapted to increase the direct component in case the first directional parameter is within a predetermined central range of the first directional parameters and/or to decrease the direct component in case the first directional parameter is outside of the predetermined range of the first directional parameters; and wherein the downmix modification unit is adapted to apply a second direction-dependent function to the diffuse component to obtain a the direction dependent weighted version of the diffuse component.

According to another embodiment, an apparatus for converting a first parametric spatial audio signal representing a first listening position or a first listening orientation in a spatial audio scene to a second parametric spatial audio signal representing a second listening position or a second listening orientation may have: a spatial audio signal modification unit adapted to modify the first parametric spatial audio signal dependent on a change of the first listening position or the first listening orientation so as to obtain the second parametric spatial audio signal, wherein the second listening position or the second listening orientation corresponds to the first listening position or the first listening orientation changed by the change; wherein the spatial audio signal modification unit includes a parameter modification unit adapted to modify a first directional parameter of the first parametric spatial audio signal so as to obtain a second directional parameter of the second parametric spatial audio signal depending on a control signal providing information corresponding to the change; wherein the parameter modification unit is adapted to modify a first diffuseness parameter of the first parametric spatial audio signal so as to obtain a second diffuseness parameter of the second parametric spatial audio signal depending on the first directional parameter or depending on the second directional parameter.

All the aforementioned methods mentioned above have in common that they aim at rendering the sound field at a reproduction side, as it was perceived at the recording position. The recording position, i.e. the position of the microphones, can also be referred to as the reference listening position. A modification of the recorded audio scene is not envisaged in these known spatial sound-capturing methods.

On the other hand, modification of the visual image is commonly applied, for example, in the context of video capturing. For example, an optical zoom is used in video cameras to change the virtual position of the camera, giving the impression, the image was taken from a different point of view. This is described by a translation of the camera position. Another simple picture modification is the horizontal or vertical rotation of the camera around its own axis. The vertical rotation is also referred to as panning or tilting.

Embodiments of the present invention provide an apparatus and a method, which also allow virtually changing the listening position and/or orientation according to the visual movement. In other words, the invention allows altering the acoustic image a listener perceives during reproduction such that it corresponds to the recording obtained using a microphone configuration placed at a virtual position and/or orientation other than the actual physical position of the microphones. By doing so, the recorded acoustic image can be aligned with the corresponding modified video image. For example, the effect of a video zoom to a certain area of an image can be applied to the recorded spatial audio image in a consistent way. According to the invention, this is achieved by appropriately modifying the spatial cue parameters and/or the downmix signal in the parametric domain of the spatial audio coder.

Embodiments of the present invention allow to flexibly change the position and/or orientation of a listener within a given spatial audio scene without having to record the spatial audio scene with a different microphone setting, for example, a different position and/or orientation of the recording microphone set-up with regard to the audio signal sources. In other words, embodiments of the present invention allow defining a virtual listening position and/or virtual listening orientation that is different to the recording position or listening position at the time the spatial audio scene was recorded.

Certain embodiments of the present invention only use one or several downmix signals and/or the spatial side information, for example, the direction-of-arrival and the diffuseness to adapt the downmix signals and/or spatial side information to reflect the changed listening position and/or orientation. In other words, these embodiments do not necessitate any further set-up information, for example, geometric information of the different audio sources with regard to the original recording position.

Embodiments of the present invention further receive parametric spatial audio signals according to a certain spatial audio format, for example, mono or stereo downmix signals with direction-of-arrival and diffuseness as spatial side information and convert this data according to control signals, for example, zoom or rotation control signals and output the modified or converted data in the same spatial audio format, i.e. as mono or stereo downmix signal with the associated direction-of-arrival and diffuseness parameters.

In a particular embodiment, embodiments of the present invention are coupled to a video camera or other video sources and modify the received or original spatial audio data into the modified spatial audio data according to the zoom control or rotation control signals provided by the video camera to synchronize, for example, the audio experience to the video experience and, for example, to perform an acoustical zoom in case a video zoom is performed and/or perform an audio rotation within the audio scene in case the video camera is rotated and the microphones do not physically rotate with the camera because they are not mounted on the camera.

BRIEF DESCRIPTION OF THE DRAWINGS

Embodiments of the present invention will be detailed subsequently referring to the appended drawings, in which.

Figure 1:
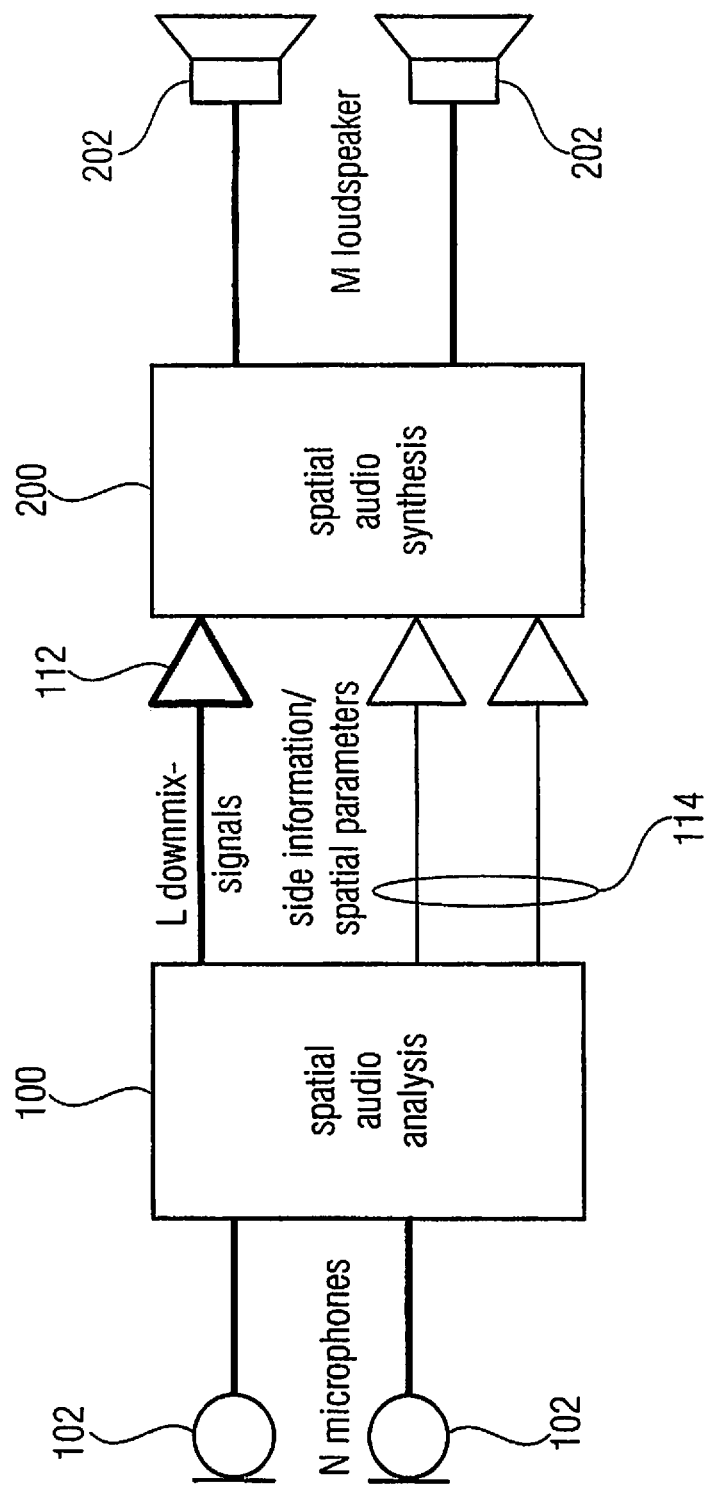
FIG. 1 shows a block diagram of a parametric spatial audio coder.

Equal or equivalent elements or elements with equal or equivalent functionality are denoted in the following description of the FIGS. by equal or equivalent reference numerals.

DETAILED DESCRIPTION OF THE INVENTION

For a better understanding of embodiments of the present invention, a typical spatial audio coder is described. The task of a typical parametric spatial audio coder is to reproduce the spatial impression that was present at the point where it was recorded. Therefore, a spatial audio coder consists of an analysis part 100 and a synthesis part 200, as shown in FIG. 1. At the acoustic front end, N microphones 102 are arranged to obtain N microphone input signals that are processed by the spatial audio analysis unit 100 to produce L downmix signals 112 with L<N together with spatial side information 114. In the decoder, i.e. in the spatial audio synthesis unit, the downmix signal 112 and the spatial side information 114 are used to compute M loudspeaker channels for M loudspeakers 202, which reproduce the recorded sound field with the original spatial impression. The thick lines (the lines between the microphones 102 and the spatial audio analysis unit 100, the L downmix signals 112 and the M signal lines between the spatial audio synthesis unit 200 and the M loudspeakers 202) symbolize audio data, whereas the thin lines 114 between the spatial audio analysis unit 100 and the spatial audio synthesis unit 200 represent the spatial side information.

In the following, the basic steps included in the computation of the spatial parameters or, in other words, for the spatial audio analysis as performed by the spatial audio analysis unit 100, will be described in more detail. The microphone signals are processed in a suitable time/frequency representation, e.g., by applying a short-time Fourier Transform (STFT) or any other filterbank. The spatial side information determined in the analysis stage contains a measure corresponding to the direction-of-arrival (DOA) of sound and a measure of the diffuseness of the sound field, which describes the relation between direct and diffuse sound of the analyzed sound field.

In DirAC, it has been proposed to determine the DOA of sound as the opposite direction of the active intensity vector. The relevant acoustic information is derived from a so-called B-format microphone input, corresponding to the sound pressure and the velocity obtained by microphones configuration providing a dipole pick-up pattern, which are aligned with the axes of Cartesian coordinate system. In other words, the B-format consists of four signals, namely w(t), x(t), y(t) and z(t). The first corresponds to the pressure measured by an omnidirectional microphone, whereas the latter three are signals of microphones having figure-of-eight pick-up patterns directed towards the three axes of a Cartesian coordinate system. The signals x(t), y(t) and z(t) are proportional to the components of particle velocity vectors directed towards x, y and z, respectively. Alternatively, the approach presented in SAM uses a priori knowledge of the directivity pattern of stereo microphones to determine the DOA of sound.

The diffuseness measure can be obtained by relating the active sound intensity to the overall energy of the sound field as proposed in DirAC. Alternatively, the method as described in SAM proposes to evaluate the coherence between different microphone signals. It should be noted that diffuseness could also be considered as a general reliability measure for the estimated DOA. Without loss of generality, in the following it is assumed that the diffuseness lies in the range of [1, 0], where a value of 1 indicates a purely diffuse sound field, and a value of 0 corresponds to the case where only direct sound is present. In other embodiments, other ranges and values for the diffuseness can be used.

The downmix signal 112, which is accompanied with the side information 114, is computed from the microphone input signals. It can be mono or include multiple audio channels. In case of DirAC, commonly only a mono signal, corresponding to the sound pressure, as obtained by an omnidirectional microphone is considered. For the SAM approach, a two-channel stereo signal is used as downmix signal.

In the following, the synthesis of loudspeaker signals used for reproduction as performed by the spatial audio synthesis unit 200 is described in further detail. The input of the synthesis 200 is the downmix signal 112 and the spatial parameters 114 in their time-frequency representation. From this data, M loudspeaker channels are calculated such that the spatial audio image or spatial audio impression is reproduced correctly. Let $Y_i$ (k,n), with i=1 ... M, denote the signal of the i-th physical loudspeaker channel in time/frequency representation with the time and frequency indices k and n, respectively. The underlying signal model for the synthesis is given by $$Y_i(k,n) = g_i(k,n)S(k,n) + D_i\{N(k,n)\}, \quad (1)$$

where S(k,n) corresponds to direct sound component and N(k,n) represents the diffuse sound component. Note that for correct reproduction of diffuse sound, a decorrelation operation $D_i\{\ \}$ is applied to the diffuse component of each loudspeaker channel. The scaling factor $g_i(k,n)$ depends on the DOA of the direct sound included in the side information and the loudspeaker configuration used for playback. A suitable choice is given by the vector base amplitude panning approach proposed by Pulkki, V., "Virtual sound source positioning using vector base amplitude panning," J. Audio Eng. Soc., Vol. 45, pp 456-466, June 1997, in the following referred to as [VBAP].

In DirAC, the direct sound component is determined by appropriate scaling of the mono downmix signal W(k,n), and obtained according to:

$$S(k,n) = W(k,n)\sqrt{1-\Psi(k,n)} \quad (2)$$

The diffuse sound component is obtained according to $$N(k,n) = \frac{1}{\sqrt{M}} W(k,n) \cdot \sqrt{\Psi(k,n)} \quad (3)$$

where M is the number of loudspeakers used.

In SAM, the same signal model as in (1) is applied, however, the direct and diffuse sound components are computed based on the stereo downmix signals instead.

Figure 2:
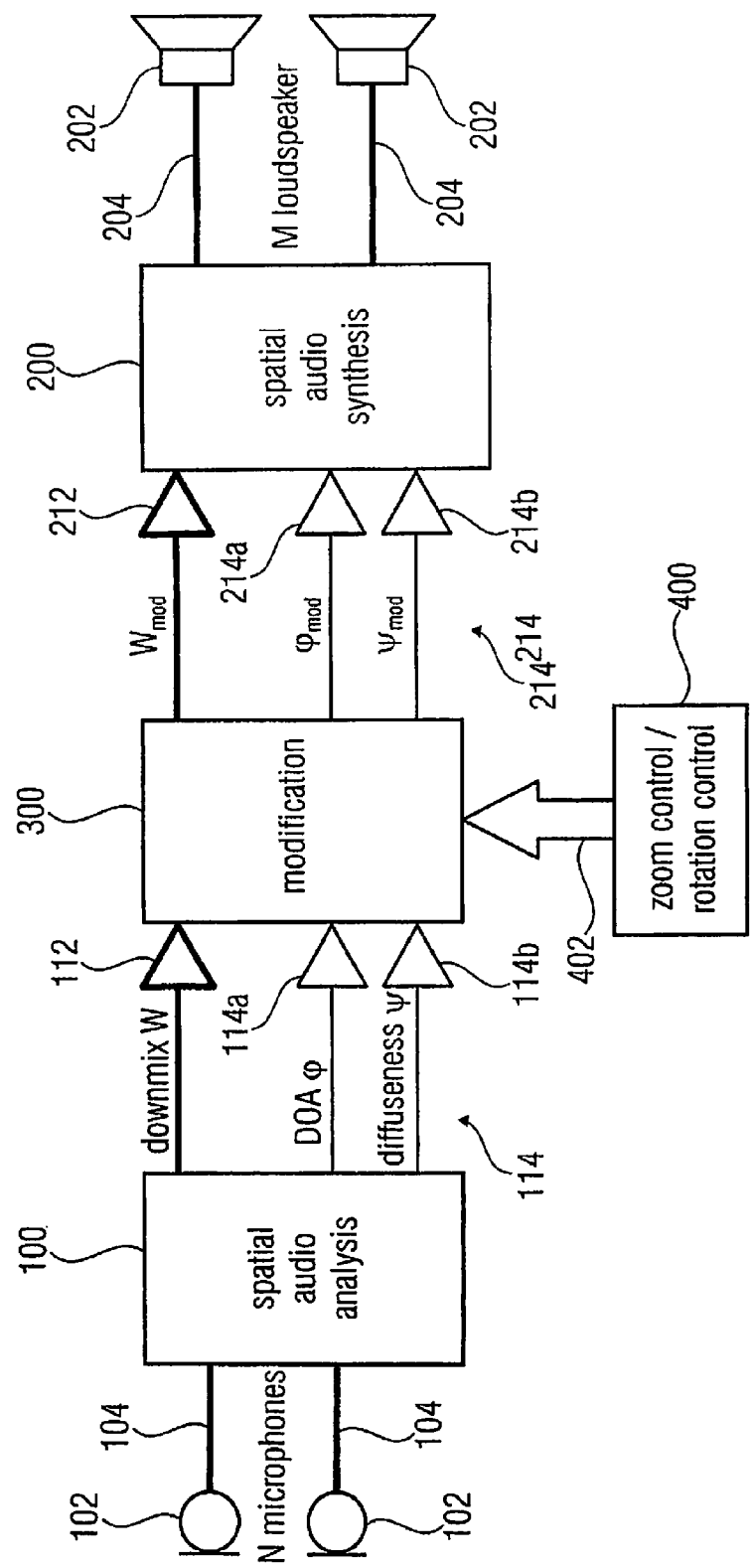
FIG. 2 shows the spatial audio coder of FIG. 1 together with an embodiment of the spatial parameter modification block coupled between the spatial audio analysis unit and the spatial audio synthesis unit of the spatial audio coder.
Figure 3A:
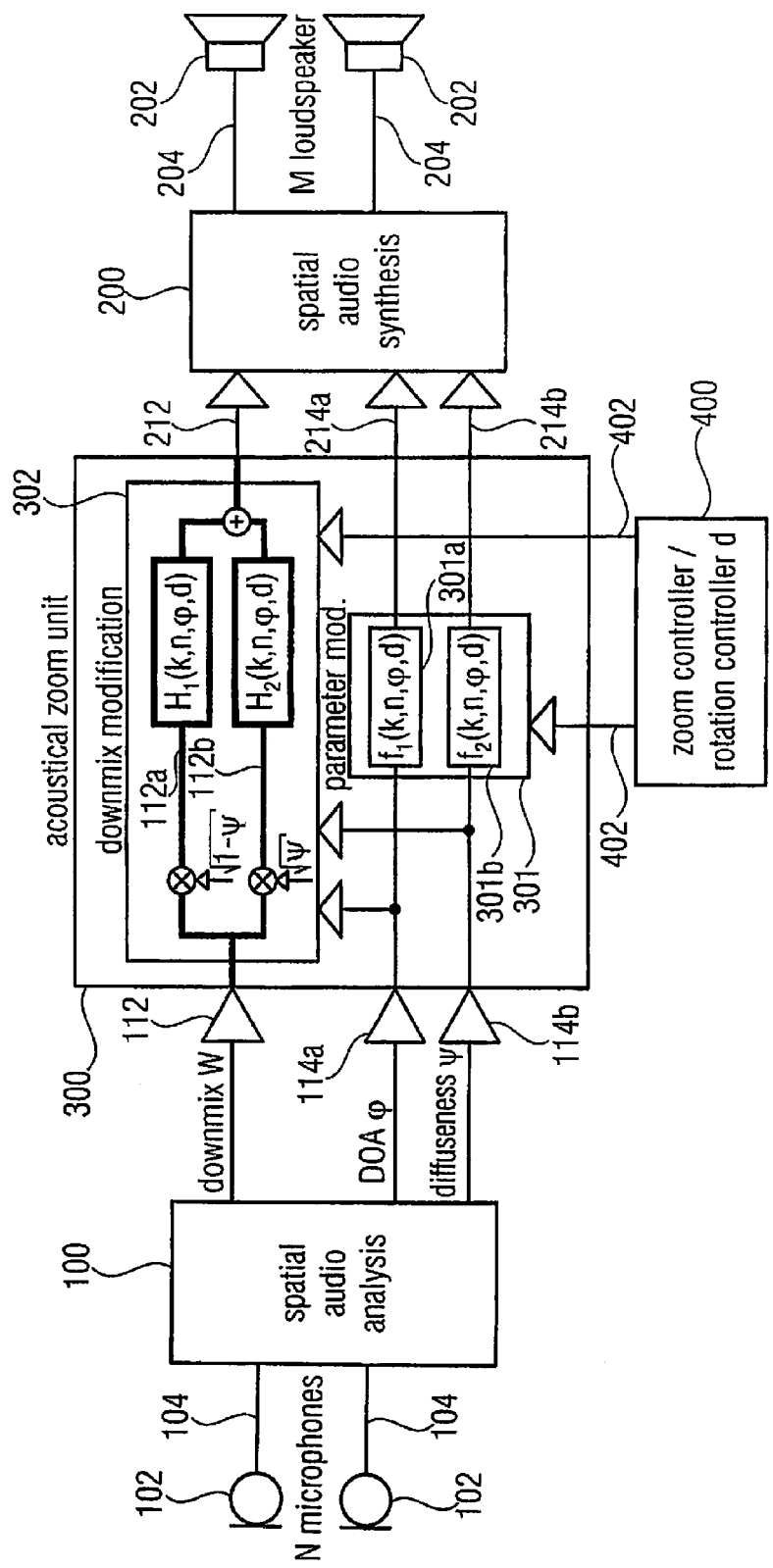
FIG. 3A corresponds to FIG. 2 and shows a more detailed embodiment of the spatial parameter modification block.

FIG. 2 shows a block diagram of an embodiment of the present invention integrated in the exemplary environment of FIG. 1, i.e. integrated between a spatial analysis unit 100 and a spatial audio synthesis unit 200. As explained based on FIG. 1, the original audio scene is recorded with a specific recording set-up of microphones specifying the location and orientation (in case of directional microphones) relative to the different audio sound sources. The N microphones provide N physical microphone signals or channel signals, which are processed by the spatial audio analysis unit 100 to generate one or several downmix signals W 112 and the spatial side information 114, for example, the direction-of-arrival (DOA) φ 114a and the diffuseness Ψ 114b. In contrast to FIG. 1, these spatial audio signals 112, 114a, 114b are not provided directly to the spatial audio synthesis unit 200, but are modified by an apparatus for converting or modifying a first parametric spatial audio signal 112, 114a, 114b representing a first listening position and/or a first listening orientation (in this example, the recording position and recording orientation) in a spatial audio scene to a second parametric spatial audio signal 212, 214a, 214b, i.e. a modified downmix signal $W_{mod}$ 212, a modified direction-of-arrival signal $\phi_{mod}$ 214a and/or a modified diffuseness signal $\Psi_{mod}$ 214b representing a second listening position and/or second listening orientation that is different to the first listening position and/or first listening orientation. The modified direction-of-arrival 214a and the modified diffuseness 214b are also referred to as modified spatial audio information 214. The apparatus 300 is also referred to as a spatial audio signal modification unit or spatial audio signal modification block 300. The apparatus 300 in FIG. 3A is adapted to modify the first parametric spatial audio signal 112, 114 depending on a control signal d 402 provided by a, e.g. external, control unit 400. The control signal 402 can, e.g. be a zoom control signal defining or being a zoom factor d or a zoom parameter d, or a rotation control signal 402 provided by a zoom control and/or a rotational control unit 400 of a video camera. It should be noted that a zoom in a certain direction and a translation in the same direction are just two different ways of describing a virtual movement in that certain direction (the zoom by a zoom factor, the translation by an absolute distance or by a relative distance relative to a reference distance). Therefore, explanations herein with regard to a zoom control signal apply correspondingly to translation control signals and vice versa, and the zoom control signal 402 also refers to a translation control signal. The term d can on one hand represent the control signal 402 itself, and on the other hand the control information or parameter contained in the control signal. In further embodiments, the control parameter d represents already the control signal 402. The control parameter or control information d can be a distance, a zoom factor and/or a rotation angle and/or a rotation direction.

As can be seen from FIG. 2, the apparatus 300 is adapted to provide parametric spatial audio signals 212, 214 (downmix signals and the associated side information/parameters) in the same format as the parametric spatial audio signals 112, 114 it received. Therefore, the spatial audio synthesis unit 200 is capable (without modifications) of processing the modified spatial audio signal 212, 214 in the same manner as the original or recorded spatial audio signal 112, 114 and to convert them to M physical loudspeaker signals 204 to generate the sound experience to the modified spatial audio scene or, in other words, to the modified listening position and/or modified listening orientation within the otherwise unchanged spatial audio scene.

In other words, a block schematic diagram of an embodiment of the novel apparatus or method is illustrated in FIG. 2. As can be seen, the output 112, 114 of the spatial audio coder 100 is modified based on the external control information 402 in order to obtain a spatial audio representation 212, 214 corresponding to a listening position, which is different to the one used in the original location used for the sound capturing. More precisely, both the downmix signals 112 and the spatial side information 114 are changed appropriately. The modification strategy is determined by an external control 400, which can be acquired directly from a camera 400 or from any other user interface 400 that provides information about the actual position of the camera or zoom. In this embodiment, the task of the algorithm, respectively, the modification unit 300 is to change the spatial impression of the sound scene in the same way as the optical zoom or camera rotation changes the point-of-view of the spectator. In other words, the modification unit 300 is adapted to provide a corresponding acoustical zoom or audio rotation experience corresponding to the video zoom or video rotation.

FIG. 3A shows a block diagram or system overview of an embodiment of the apparatus 300 that is referred to as "acoustical zoom unit". The embodiment of the apparatus 300 in FIG. 3A comprises a parameter modification unit 301 and a downmix modification unit 302. The parameter modification unit 301 further comprises a direction-of-arrival modification unit 301a and a diffuseness modification unit 301b. The parameter modification unit 301 is adapted to receive the direction-of-arrival parameter 114a and to modify the first or received direction-of-arrival parameter 114a depending on the control signal d 402 to obtain the modified or second direction-of-arrival parameter 214a. The parameter modification unit 301 is further adapted to receive the first or original diffuseness parameter 114b and to modify the diffuseness parameter 114b by the diffuseness modification unit 301b to obtain the second or modified diffuseness parameter 214b depending on the control signal 402. The downmix modification unit 302 is adapted to receive the one or more downmix signals 112 and to modify the first or original downmix signal 112 to obtain the second or modified downmix signal 212 depending on the first or original direction-of-arrival parameter 114a, the first or original diffuseness parameter 114b and/or the control signal 402.

If the camera is controlled independently from the microphones 102, embodiments of the invention provide a possibility to synchronize the change of the audio scene or audio perception according to the camera controls 402. In addition, the directions can be shifted without modifying the downmix signals 112 if the camera 400 is only rotated horizontally without the zooming, i.e. applying only a rotation control signal and no zooming control signal 402. This is described by the "rotation controller" in FIGS. 2 and 3.

The rotation modification is described in more detail in the section about directional remapping or remapping of directions. The sections about diffuseness and downmix modification are related to the translation or zooming application.

Embodiments of the invention can be adapted to perform both, a rotation modification and a translation or zoom modification, e.g. by first performing the rotation modification and afterwards the translation or zoom modification or vice versa, or both at the same time by providing corresponding directional mapping functions.

To achieve the acoustical zooming effect, the listening position is virtually changed, which is done by appropriately remapping the analyzed directions. To get a correct overall impression of the modified sound scene, the downmix signal is processed by a filter, which depends on the remapped directions. This filter changes the gains, as, e.g., sounds that are now closer are increased in level, while sounds from regions out-of-interest may be attenuated. Also, the diffuseness is scaled with the same assumptions, as, e.g., sounds that appear closer to the new listening position have to be reproduced less diffuse than before.

In the following, a more detailed description of the algorithm or method performed by the apparatus 300 is given. An overview of the acoustical zoom unit is given in FIG. 3A. First, the remapping of the directions is described (block 301a, $f_p(k,n,\phi,d)$), then the filter for the diffuseness modification (block 301b, $f_d(k,n,\phi,d)$) is illustrated. Block 302 describes the downmix modification, which is dependent on the zoom control and the original spatial parameters.

In the following section, the remapping of the directions, respectively the remapping of the direction-of-arrival parameters as, for example, performed by direction modification block 301a, is described.

The direction-of-arrival parameter (DOA parameter) can be represented, for example, by a unit vector e. For or a three-dimensional (3D) sound field analysis, the vector can be expressed by $$e = \begin{bmatrix} \cos\varphi\cos\theta \\ \sin\varphi\cos\theta \\ \sin\theta \end{bmatrix} \quad (4)$$

where the azimuth angle φ corresponds to the DOA in the two-dimensional (2D) plane, namely the horizontal plane. The elevation angle is given by θ. This vector will be altered, according to the new virtual position of the microphone as described next.

Figure 4:
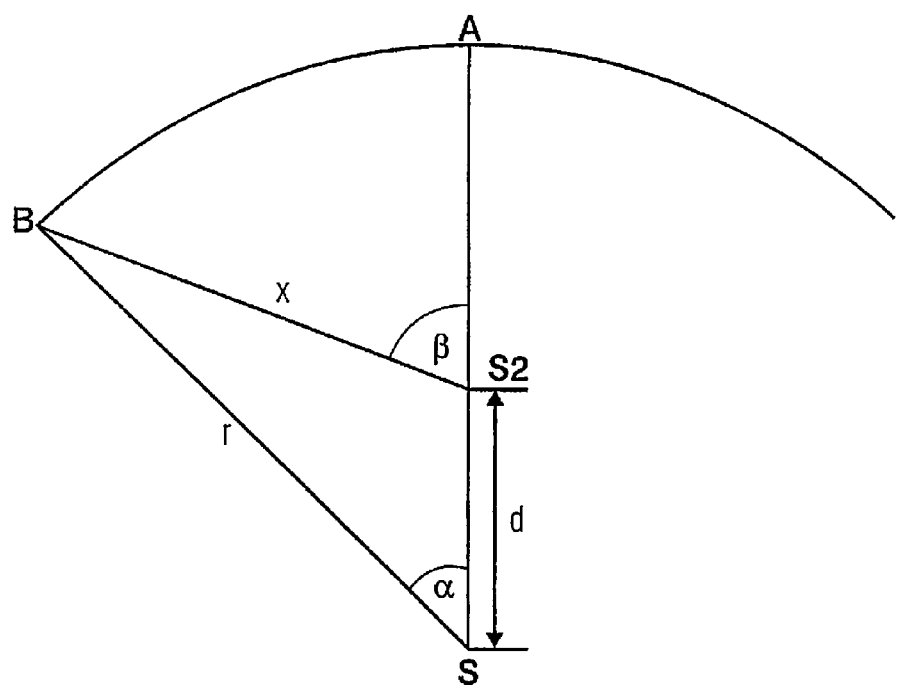
FIG. 4 shows an exemplary geometric overview of an acoustical zoom.

Without loss of generality, an example of the DOA remapping is given for the two-dimensional case for presentation simplicity (FIG. 4). A corresponding remapping of the three-dimensional DOA can be done with similar considerations.

Figure 5A:
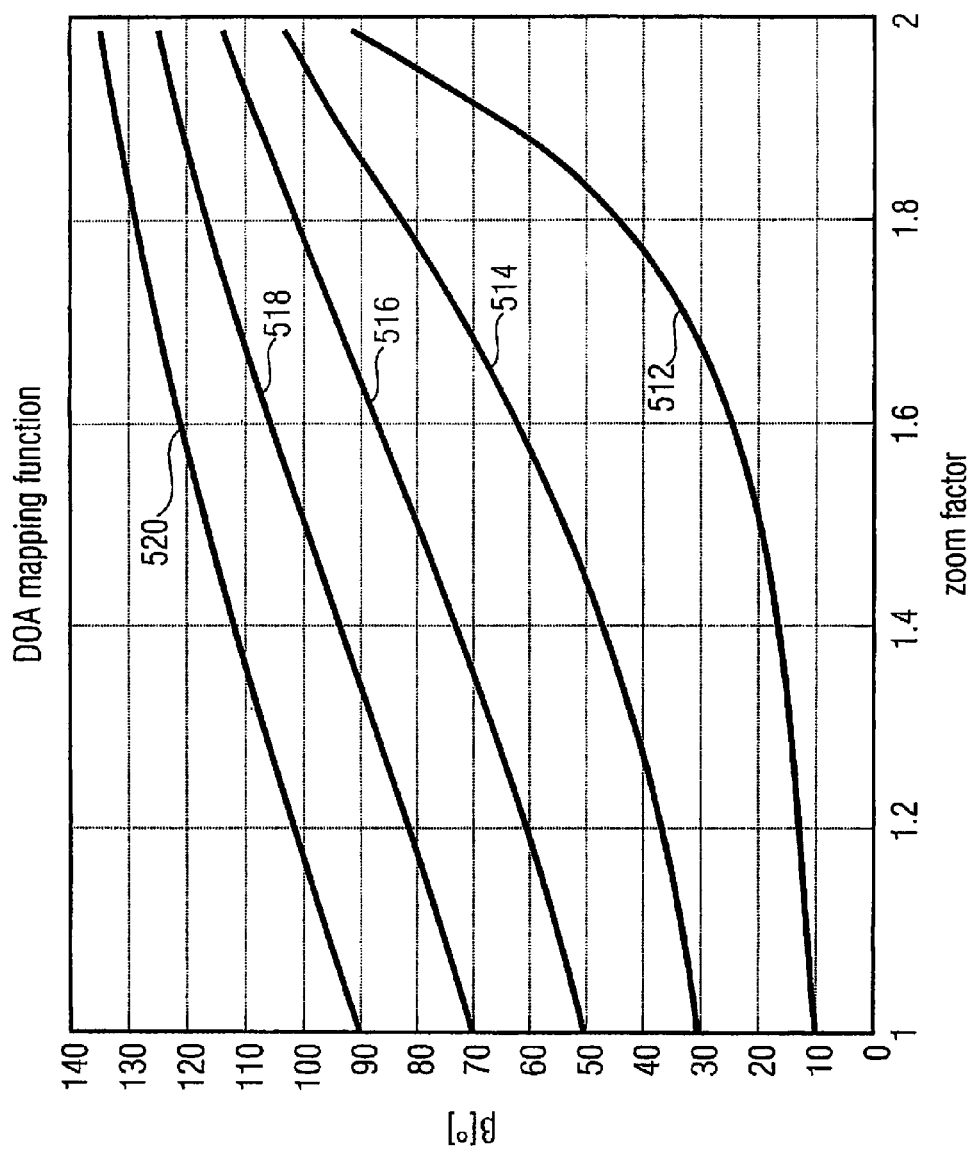
FIG. 5A shows an example of a directional mapping function $f_p(k,n,\phi,d)$ for the direction-of-arrival (DOA) mapping.

FIG. 4 shows a geometric overview of an exemplarily geometric overview of the acoustical zoom. The position S marks the original microphone recording position, i.e., the original listening position. A and B mark spatial positions within the observed 2-dimensional plane. It is now assumed that the listening position is moved from S to S2, e.g. in direction of the first listening orientation. As can be seen from FIG. 4, the sound emerging from spatial position A stays in the same angular position relative to the recording location, whereas sounds from the area or spatial position B are moved to the side. This is denoted by a changing of the analyzed angle α to β. β thus denotes the direction-of-arrival of sound coming from the angular position of B if the listener had been placed in S2. For the considered example, the azimuth angle is increased from α to β as shown in FIG. 4. This remapping of the direction-of-arrival information can be written as a vector transformation according to $$e_{mod}=f(e), \quad (5)$$

where f( ) denotes a remapping function and $e_{mod}$ is the modified direction vector. This function is a nonlinear transformation, dependent on the zoom factor d and the original estimated DOAs. FIG. 5A shows examples for the mapping f( ) for different values of α as can be applied in the two-dimensional example shown in FIG. 4. For the zoom control factor of d=1, i.e., no zoom is applied, the angles are equal to the original DOA α. For increasing zoom control factors, the value of β is increased, too. The function can be derived from geometric considerations or, alternatively, be chosen heuristically. Thus, remapping of the directions means that each DOA is modified according to the function f( ). The mapping $f_p(k,n,\phi,d)$ is performed for every time and frequency bin (k,n).

Although, in FIG. 4 the zoom parameter d is depicted as a translational distance d between the original listening position S and the modified listening position S2, as mentioned before, d can also be a factor, e.g. an optical zoom like an 4× or 8× zoom. Especially for the width or filter control, seeing d as a factor, not as a distance, allows for an easy implementation of the acoustical zoom. In other words, the zoom parameter d is in this case a real distance, or at least proportional to a distance.

It should be further noted that embodiments of the invention can also be adapted to support besides the "zoom-in" as described above, e.g. reducing a distance to an object (e.g. to object A in FIG. 4 by moving from position S to position S2), also a "zoom-out", e.g. increasing a distance to an object (e.g. to object A in FIG. 4 by moving from position S2 to position S). In this case the inverse considerations apply compared to the zoom-in as described because objects positioned on a side of the listener (e.g. object B with regard to position S2) move to the front of the listener when he moves to position S. In other words the magnitudes of the angles are reduced (e.g. from β to α).

The remapping of the directions or vector transformation is performed by the direction-of-arrival modification unit 301a. FIG. 5A shows an exemplarily mapping function (dependent on the zoom factor d) for the direction-of-arrivals for the scenario shown in FIG. 4. The diagram of FIG. 5A shows the zoom factor on the x-axis ranging from 1 to 2 and the modified or mapped angle β on the y-axis. For a zoom factor of 1, β=α, i.e. the initial angle is not modified. Reference sign 512 refers to the mapping function $f_p$ for α=10°, reference sign 514 represents the mapping function $f_p$ for β=30°, reference sign 516 the mapping function $f_p(k,n,\phi,d)$ for α=50°, reference sign 518 the mapping function $f_p(k,n,\phi,d)$ for α=70°, and reference sign 520 the mapping function $f_p(k,n,\phi,d)$ for α=90°.

Embodiments of the invention can be adapted to use the same mapping function $f_p$ for all time and frequency bin values defined by k and n, or, may use different mapping functions for different time values and/or frequency bins.

As becomes apparent from the above explanations, the idea behind the filter $f_d$ is to change the diffuseness ψ such that it lowers the diffuseness for zoomed-in directions (φ<|γ|) and increases the diffuseness for out-of-focus directions (φ>|γ|).

To simplify the determination of the mapped angle β, certain embodiments of the modification unit 301a are adapted to only use the direction and to assume that all sources, e.g. A and B, defining the direction-of-arrival of the sound have the same distance to the first listening position, e.g. are arranged on a unit radius.

If a loudspeaker setup is considered, which only reproduces sound coming from frontal directions, e.g., a typical stereo loudspeaker setup, the mapping function f( ) can be designed such that the maximum angle, to where DOAs are remapped, is limited. For example, a maximum angle of ±60° is chosen, when the loudspeakers are positioned at ±60°. This way, the whole sound scene will stay in the front and is only widened, when the zoom is applied.

In case of a rotation of the camera, the original azimuth values are just shifted such that the new looking direction corresponds to an angle of zero. Thus, a horizontal rotation of the camera by 20° would result in β=α−20°. Also, the downmix and the diffuseness are not changed for this special case, unless a rotation and translation are carried out simultaneously.

As can be seen from the aforementioned explanations, the rotational change or difference is derived starting from the first listening orientation respectively first viewing orientation (e.g. direction of the "nose" of the listener respectively viewer) defining a first reference or 0° orientation. When the listening orientation changes, the reference or 0° orientation changes accordingly. Therefore, embodiments of the present invention change the original angles or directions of arrival of the sound. i.e. the first directional parameter, according to the new reference or 0° orientation such that the second directional parameter represents the same "direction of arrival" in the audio scene, however relative to the new reference orientation or coordinate system. Similar considerations apply to the translation respectively zoom, where the perceived directions-of-arrival change due to the translation or zoom in direction of the first listening orientation (see FIG. 4).

The first directional parameter 114a and the second directional parameter 214a can be two-dimensional or three-dimensional vectors. In addition, the first directional parameter 114a can be a vector, wherein the control signal 402 is a rotation control signal defining a rotation angle (e.g. 20° in the aforementioned example) and a rotation direction (to the right in the aforementioned two-dimensional example), and wherein the parameter modification unit 301, 301a is adapted to rotate the vector by the rotation angle in a reverse direction to the rotation direction (β=α−20° in the aforementioned example) to obtain the second directional parameter, i.e. the second or modified vector 214a.

In the following section, the diffuseness scaling as, for example, performed by the diffuseness modification unit 301b is described in more detail.

The diffuseness is scaled with a DOA-dependent window. In certain embodiments, values of the diffuseness ψ(k,n) are decreased for the zoomed-in directions, while the diffuseness values for the directions out-of-interest are increased. This corresponds to the observation that sound sources are perceived less diffuse if they are located closer to the listening position. Therefore, for example, for a minimum zoom factor (e.g. d=1), the diffuseness is not modified. The range of the visual angle covered by the camera image can be taken as a controller for the scaling by which the diffuseness value is increased or decreased.

The terms zoomed-in-directions or directions-of-interest refer to an angular window of interest, also referred to as central range of angles, that is arranged around the first or original listening direction, e.g. the original 0° reference direction. The angular window or central range is determined by the angular values γ defining the border of the angular window. The angular window and the width of the angular window can be defined by the negative border angle −γ and the positive border angle γ, wherein the magnitude of the negative border angle may be different to the positive border angle. In embodiments, the negative border angle and the positive border angle have the same magnitude (symmetric window or central range of angles centered around the first listening orientation). The magnitude of the border angle is also referred to as angular width and the width of the window (from the negative border angle to the positive border angle) is also referred to as total angular width.

According to embodiments of the invention, direction-of-arrival parameters, diffuseness parameters, and/or direct or diffuse components can be modified differently depending on whether the original direction-of-arrival parameter is inside the window of interest, e.g. whether the DOA-angle or a magnitude of the DOA-angle relative to the first listening position is smaller than the magnitude of the border angle or angular width γ, or whether the original direction-of-arrival parameter is outside the window of interest, e.g. whether the DOA-angle or a magnitude of the DOA-angle relative to the first listening position is larger than the magnitude of the border angle or angular width γ. This is also referred to as direction-dependent and the corresponding filter functions as direction dependent filter functions, wherein the angular width or border angle γ defines the angle at which the corresponding filter changes from increasing the parameter to decreasing the parameter or vice versa.

Figure 5B:
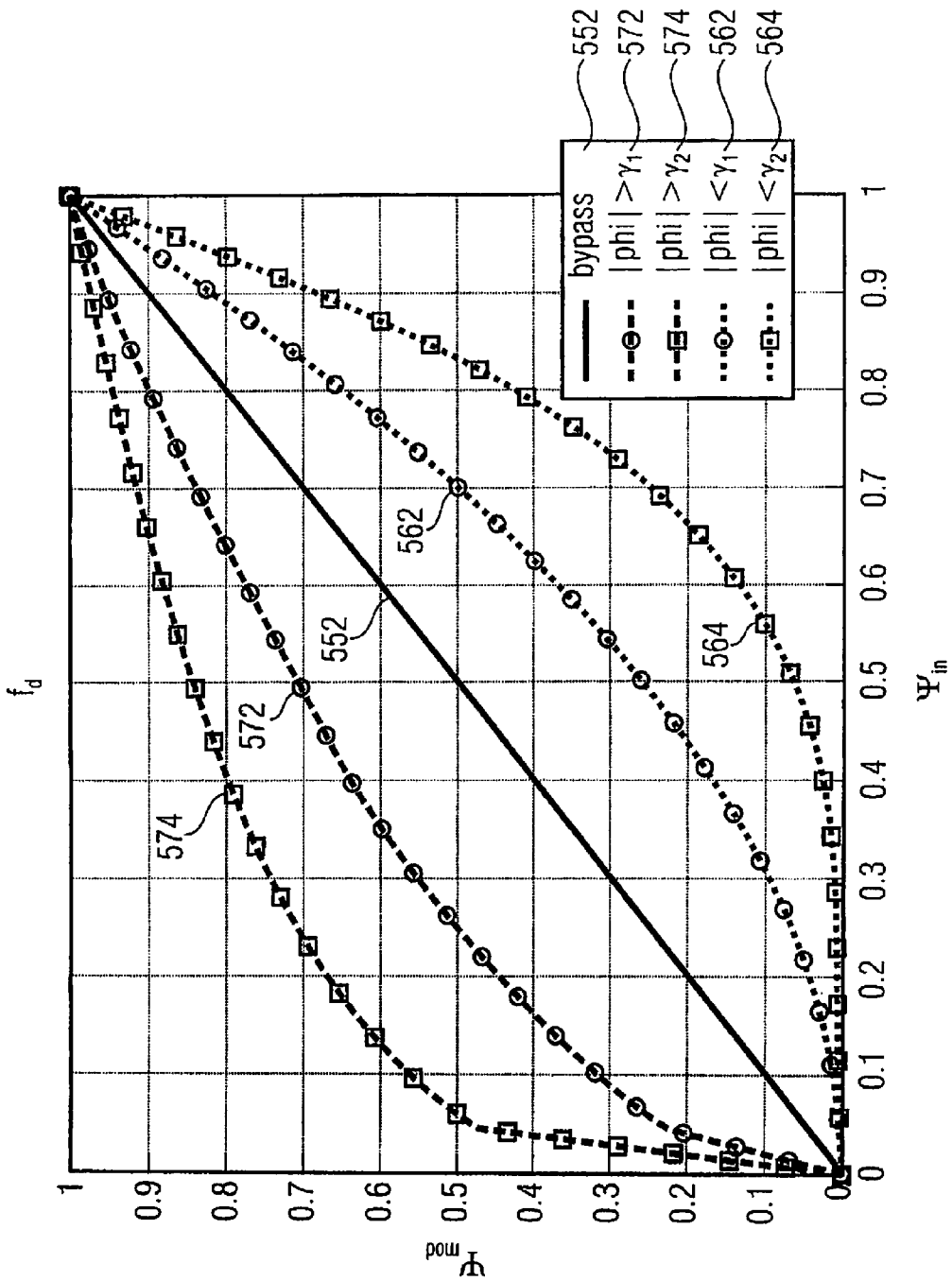
FIG. 5B shows an example of a diffuseness mapping function $f_d(k,n,\phi,d)$ for the diffuseness mapping.

Referring back to the diffuseness modification unit 301b, the diffuseness modification unit 301b is adapted to modify the diffuseness ψ by the function $f_d(k,n,\phi,d)$ or $f_d$ which is dependent on the time/frequency indices k,n, the original direction-of-arrival φ, and the zoom controller d. FIG. 5B shows an embodiment of a filter function $f_d$. The filter $f_d$ may be implemented as an inversion of the filter function $H_1$, which will be explained later, however, adapted to match the diffuseness range, for example the range between [0 . . . 1]. FIG. 5B shows the mapping function or filter $f_d$, wherein the x-axis represents the original or first diffuseness ψ, in FIG. 5B also referred to as $\psi_{in}$, with the range from 0 to 1, and the y-axis represents the second or modified diffuseness $\psi_{mod}$ also in the range of 0 to 1. In case no zoom is applied (d=0), the filter $f_d$ does not change the diffuseness at all and is set to bypass, i.e. $\psi_{mod}=\psi_{in}$ respectively. Reference sign 552 depicts the bypass line.

If the original direction-of-arrival lies within the angular width γ, the diffuseness is decreased. If the original directionof-arrival is outside the angular width γ, the diffuseness is increased. FIG. 5B shows some prototype functions of $f_d$, namely 562, 564, 572 and 574 depending on the look width or angular width γ. In the example shown in FIG. 5B the angular width is smaller for $γ_2$ than for $γ_1$, i.e. $γ_2 < γ_1$. Thus, $γ_2$ corresponds to a higher zoom factor d than $γ_1$.

The area below the bypass line 552 defines the modified diffuseness values $ψ_{mod}$ in case the original direction-of-arrival σ is within the angular width γ which is reflected by a reduction of the modified diffuseness value $ψ_{mod}$ compared to the original diffuseness value $ψ_{in}$ or ψ after the mapping by the filter $f_d$. The area above the bypass line 552 represents the mapping of the original diffuseness ψ to the modified diffuseness values $ψ_{mod}$ in case the original direction-of-arrival φ is outside the window. In other words, the area above the bypass line 552 shows the increase of the diffuseness after the mapping. In embodiments, the angular width γ decreases with an increasing zoom factor d. In other words, the higher a zoom factor d, the smaller the angular width γ. In addition, embodiments can be adapted such that the zoom factor d or translation information not only influences the angular width γ of the filter function $f_d$ but also the degree or factor the diffuseness is increased in case it is inside the window and the degree or factor the diffuseness ψ is decreased in case it is outside the window defined by the angular width γ. Such an embodiment is shown in FIG. 5B, wherein the angular width $γ_1$ corresponds to a zoom factor $d_1$, and the angular width $γ_2$ corresponds to a zoom factor $d_2$, wherein $d_2$ is larger than $d_1$ and, thus, the angular width $γ_2$ is smaller than angular width $γ_1$. In addition, the function $f_d$ represented by reference sign 564 and corresponding to the larger zoom factor $d_2$ maps the original diffuseness values $ψ_{in}$ to lower modified diffuseness values $γ_{mod}$ than the filter function $f_d$ represented by 562 corresponding to the lower zoom factor $d_1$. In other words, embodiments of the filter function can be adapted to reduce the original diffuseness the more the smaller the angular width γ. The corresponding applies to the area above the bypass line 552 in an inverse manner. In other words, embodiments of the filter function $f_d$ can be adapted to map the original diffuseness $ψ_{in}$ to the modified diffuseness $ψ_{mod}$ dependent on the zoom factor d and the angular width γ, or the higher the zoom factor d the smaller the angular width γ and/or the higher the increase of the diffuseness for direction-of-arrival φ outside the window.

In further embodiments, the same direction dependent window or filter function $f_d(k,n,φ,d)$ is applied for all zoom factors. However, the use of different direction dependent window or filter functions with smaller angular widths for higher translation or zoom factors matches the audio experience of the user better and provides a more realistic audio perception. The application of different mapping values for different zoom factors (higher reduction of the diffuseness with increasing zoom factor for direction-of-arrival value φ inside the window, and increasing or higher diffuseness values for higher zoom factors in case the direction-of-arrival value φ is outside the angular width γ) even further improve the realistic audio perception.

In the following, embodiments of the downmix modification as, for example, performed by the downmix modification unit 302, are described in more detail.

The filters for the downmix signal are used to modify the gain of the direct and diffuse part of the output signal. As a direct consequence of the spatial audio coder concept, the loudspeaker signals are thus modified. The sound of the zoomed-in area is amplified, while sound from out-of-interest directions can be attenuated.

As the downmix signal 112 may be a mono or a stereo signal for directional audio coding (DirAC) or spatial audio microphones (SAM), in the following, two different embodiments of the modification are described.

First, an embodiment for a mono downmix modification, i.e. an embodiment for a modification of a mono downmix audio signal W 112 is described. For the following considerations, it is useful to introduce a signal model of the mono downmix signal W(k,n) which is similar to the one already applied for the loudspeaker signal synthesis according to (1):

$$W(k,n) = S(k,n) + N(k,n) \quad (6)$$

Here, S(k,n) denotes the direct sound component of the downmix signal, N(k,n) denotes the diffuse sound components in the original downmix signal, and k denotes the time index or time instant the signal represents and n represents a frequency bin or frequency channel of the signal at the given time instant k.

Let $W_{mod}(k,n)$ denote the modified mono downmix signal. It is obtained by processing the original downmix signal according to $$W_{mod}(k,n) = H_1(k,n,φ,d)S(k,n) + H_2(k,n,φ,d)N(k,n) \quad (7)$$

where H1(k,n,φ,d) and H2(k,n,φ,d) represent filters applied to the direct and the diffuse components of the signal model, φ represents the original direction-of-arrival and d the zoom factor or zoom parameter. The direct 112a and diffuse sound components 112b can be computed analogously to (2), (3), i.e. by $$S(k,n) = W(k,n)\sqrt{1-Ψ}$$

and $$N(k,n) = W(k,n) \cdot \sqrt{Ψ}.$$

Both filters are directional dependent weighting functions. For example, a cardioid shaped pickup pattern of a microphone can be taken as a design criterion for such weighting functions.

The filter $H_1(k,n,φ,d)$ can be implemented as a raised cosine window such that the direct sound is amplified for directions of the zoomed-in area, whereas the level of sound coming from other directions is attenuated. In general, different window shapes can be applied to the direct and the diffuse sound components, respectively.

The gain filter implemented by the windows may be controlled by the actual translation or zoom control factor d. For example, the zoom controls the width of equal gain for the focused directions and the width of gain in general. Examples for different gain windows are given in FIG. 6.

Figure 6:
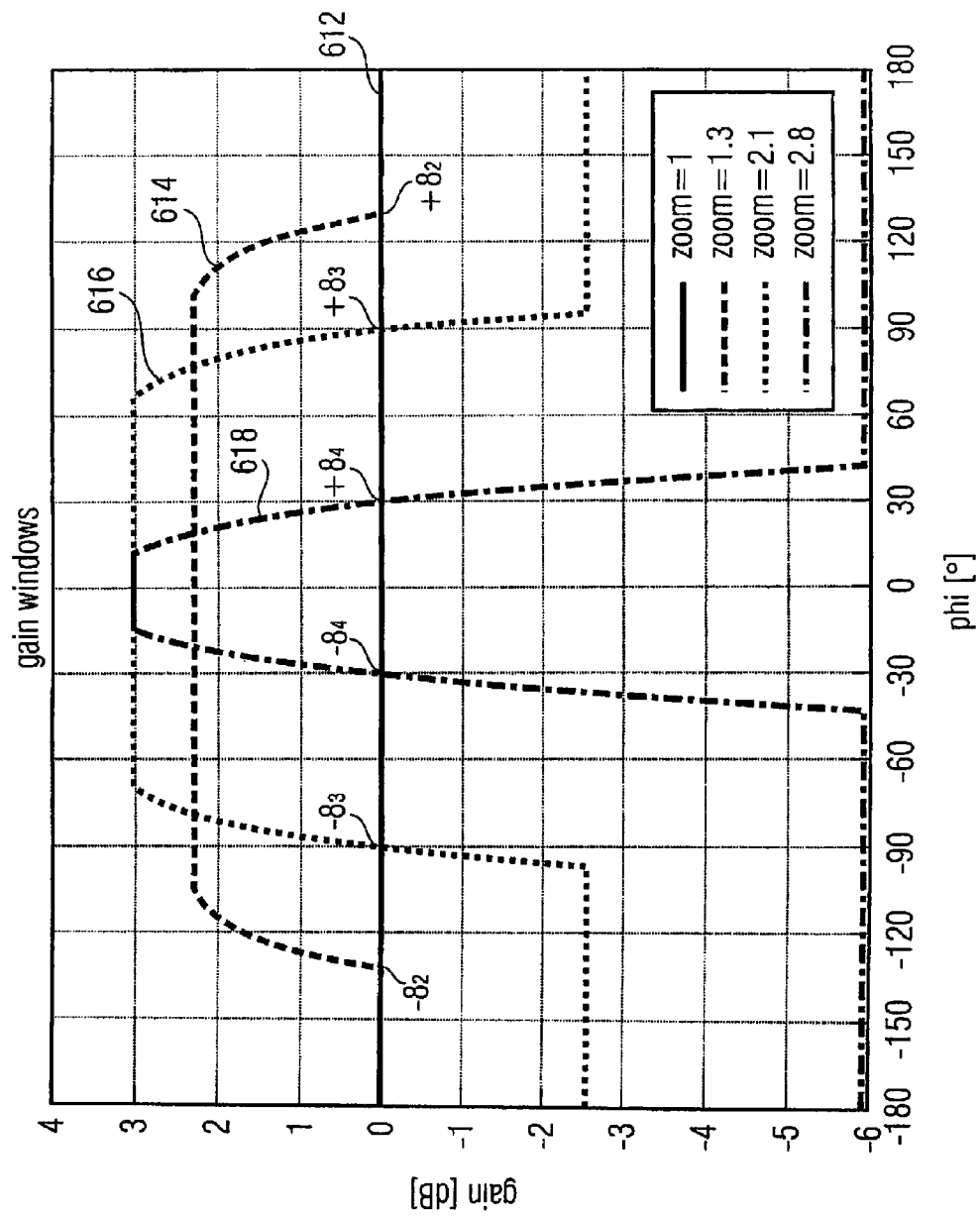
FIG. 6 shows different gain windows for the weighting filter $H_1(k,n,\phi,d)$ of the direct sound component depending on a zoom factor.

FIG. 6 shows different gain windows for the weighting filter $H_1(k,n,φ,d)$. Four different gain prototypes are shown:
1. solid line: no zoom is applied, the gain is 0 dB for all directions (see 612).
2. dashed line: a zoom factor of 1.3 is applied, the window width has a width of 210° for the maximal gain and the maximal gain is 2.3 dB (see 614).
3. dotted line: a zoom factor of 2.1 is applied, the window width for the maximal gain is decreased to 140° and the maximal gain is 3 dB, the lowest −2.5 dB (see 616).
4. dash-dotted line: the zoom factor is 2.8, the window width is 30° for the maximal gain and the gain is limited to a maximum of +3 dB and a minimum of −6 dB (see 618).

As can be seen from FIG. 6, the first listening orientation represented by 0° in FIG. 6, forms the center of different zoom factor dependent direction dependent windows, wherein the predetermined central range or width of the direction dependent windows is the smaller the greater the zoom factor. The borders of the central range or window are defined by the angle γ at which the gain is 0 dB. FIG. 6 shows symmetric windows with positive and negative borders having the same magnitude.

Window 614 has a width of 210° for the maximum gain and a predetermined central region with a width of 260° with borders +/−$γ_2$ at +/−130°, wherein direct components inside or within the predetermined central region are increased and direct components outside of the predetermined central region remain unamended (gain=0 dB).

Window 616 has a width of 140° for the maximum gain and a predetermined central region with a width of 180° with borders or angular widths +/−$γ_3$ at +/−90°, wherein direct components inside or within the predetermined central region are increased and direct components outside of the predetermined central region are reduced (negative gain down to −2.5 dB).

Window 618 has a width of 30° for the maximum gain and a predetermined central region with a width of 60° with borders or angular widths +/−$γ_4$ at +/−30°, wherein direct components inside or within the predetermined central region are increased and direct components outside of the predetermined central region are reduced (negative gain down to −6 dB).

In certain embodiment, therefore, the zoom factor d controls the width, i.e. the negative and positive borders and the total width, and the gain of the prototype windows. Thus, the window can already be designed such that the width and the gain is correctly applied to the original direction-of-arrivals φ.

The maximal gain should be limited, in order to avoid distortions in the output signals. The width of the window, or the exact shape as shown here should be considered as an illustrative example of how the zoom factor controls various aspects of a gain window. Other implementation may be used in different embodiments.

Figure 7:
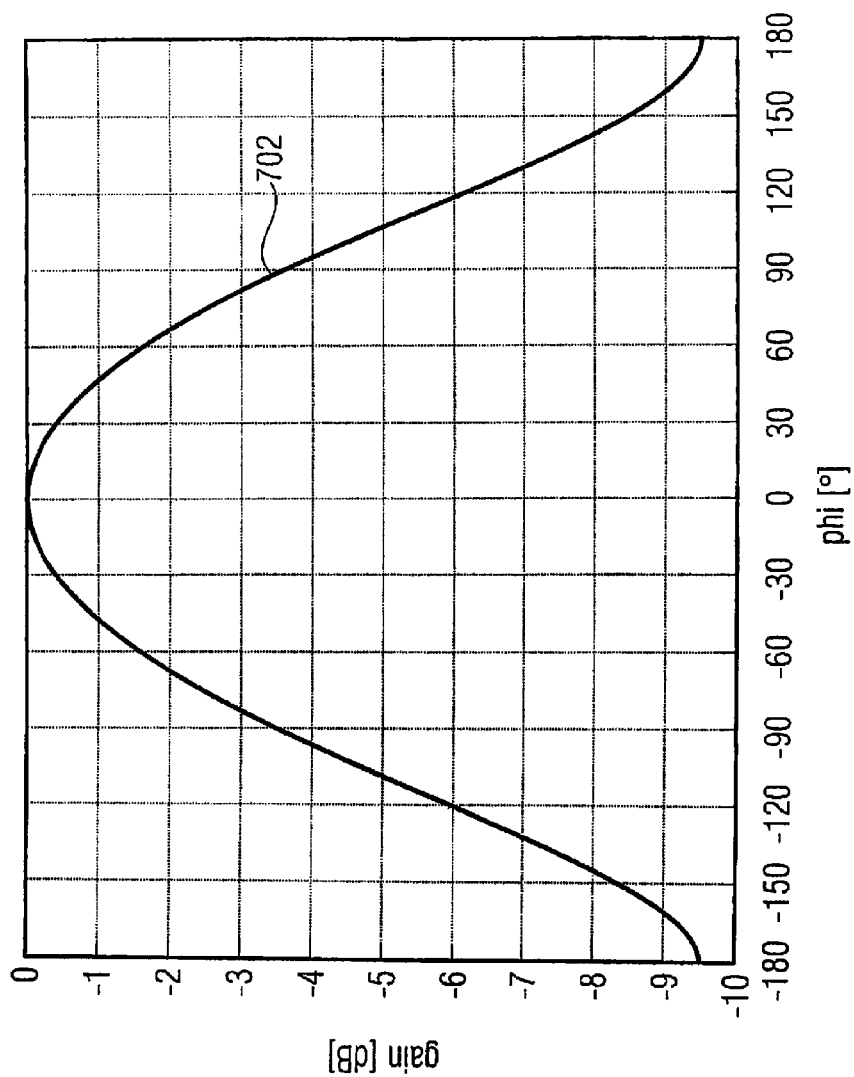
FIG. 7 shows an exemplary subcardioid window for the weighting filter $H_2(k,n,\phi,d)$ for the diffuse component.

The filter $H_2(k,n,φ,d)$ is used to modify the diffuse part 112a of the downmix signal analogously to the way how the diffuseness measure ψ(k,n) has been modified and can be implemented as a subcardioid window as shown in FIG. 7. By applying such windows the diffuse part from the out-of-interest directions are attenuated slightly, but the zoomed-in directions remain unchanged or nearly unchanged. FIG. 7 shows a subcardioid window 702 which almost keeps the diffuse component unaltered in an area between −30° and +30° of the original direction of arrival φ and attenuate the diffuse component the higher the deviation, i.e. the angle departing from the 0° orientation, of the original direction-of-arrival cp. In other words, for the zoomed-in area, the diffuse signal components in the downmix signal remain unaltered. This will result in a more direct sound reproduction in zoom direction. The sounds that come from all other directions are rendered more diffuse, as the microphone has been virtually placed farther away. Thus, those diffuse parts will be attenuated compared to those of the original downmix signal. Obviously, the desired gain filter can also be designed using the previously described raised cosine windows. Note, however, that the scaling will be less pronounced than in case of the direct sound modification. In further embodiments, the windows can depend on the zoom factor, wherein the slope of the window function 702 is the steeper the higher the zoom factor.

In the following, an embodiment of a stereo downmix modification, i.e. a modification of a stereo downmix signal W is described.

In the following it is described how the downmix modification has to be performed in case of a stereo downmix as necessitated for the SAM approach. For the original stereo downmix signal a two channels signal model analogously to the mono case (6) is introduced:

$$W_1(k,n)=S(k,n)+N_1(k,n) \quad (8)$$

$$W_2(k,n)=cS(k,n)+N_2(k,n) \quad (9)$$

Again, the signal S(k,n) represents direct sound, while $N_i$ denotes the diffuse sound for the i-th microphone. Analogously to (2), (3), the direct and diffuse sound components can be determined from the downmix channels based on the diffuseness measure. The gain factor c corresponds to a different scaling of the direct sound component in the different stereo channels, which arises from the different directivity pattern associated with the two downmix channels. More details on the relation of the scaling factor and the DOA of direct sound can be found in SAM. Since this scaling depends on the DOA of sound of the observed sound field, its value has to be modified in accordance to the DOA remapping resulting from the modified virtual recording location.

The modified stereo downmix signal corresponding to the new virtual microphone position can be written as $$W_{1,mod}(k,n)=G_{11}(k,n,φ,d)S(k,n)+G_{12}(k,n,φ,d)N_1(k,n) \quad (10)$$

$$W_{2,mod}(k,n)=G_{21}(k,n,φ,d)c_{mod}S(k,n)+G_{22}(k,n,φ,d)N_2(k,n) \quad (11)$$

The computation of the gain filters $G_{ij}(k,n,φ,d)$ is performed in accordance to the corresponding gain filters $H_i(k,n,φ,d)$ as discussed for the mono downmix case. The new stereo scaling factor $C_{mod}$ is determined as a function of the modified DOA such that it corresponds to the new virtual recording location.

Referring back to FIGS. 2 and 3A, embodiments of the present invention provide an apparatus 300 for converting a first parametric spatial audio signal 112, 114 representing a first listening position or a first listening orientation in a spatial audio scene to a second parametric spatial audio signal 212, 214 representing a second listening position or a second listening orientation, the second listening position or second listening orientation being different to the first listening position or first listening orientation. The apparatus comprises a spatial audio signal modification unit 301, 302 adapted to modify the first parametric spurious audio signal 112, 114 dependent on a change of the first listening position or the first listening orientation so as to obtain the second parametric spatial audio signal 212, 214, wherein the second listening position or the second listening orientation corresponds to the first listening position or the first listening orientation changed by the change.

Embodiments of the apparatus 300 can be adapted to convert only a single side information parameter, for example, the direction-of-arrival 114a or the diffuseness parameter 114b, or only the audio downmix signal 112 or some or all of the aforementioned signals and parameters.

As described before, in embodiments using the directional audio coding (DirAC), the analog microphone signals are digitized and processed to provide a downmixed time/frequency representation W(k,n) of the microphone signals, representing, for each time instant or block k, a frequency representation, wherein each frequency bin of the frequency or spectral representation is denoted by the index n. In addition to the downmix signal 112, the spatial audio analysis unit 100 determines for each time instant k and for each frequency bin n for the corresponding time instant k, one unit vector $e_{DOA}$ (confer equation (4)) providing for each frequency bin n and each time instant k, the directional parameter or information. In addition, the spatial audio analysis unit 100 determines for each time instant k and each frequency bin n, a diffuseness parameter ψ defining a relation between the direct sound or audio components and the diffuse sound or audio components, wherein the diffuse components are, for example, caused by two or more audio sources and/or by reflections of audio signals from the audio sources.

The DirAC is a very processing efficient and memory efficient coding as it reduces the spatial audio information defining the audio scene, for example, audio sources, reflection, position and orientation of the microphones and respectively the listener (for each time instant k and each frequency bin n) to one directional information, i.e. a unit vector $e_{DOA}$(k,n) and one diffuseness value ψ(k,n) between 0 and 1, associated to the corresponding one (mono) downmix audio signal W(k,n) or several (e.g. stereo) downmix audio signals $W_1$(k,n) and $W_2$(k,n).

Embodiments using the aforementioned directional audio coding (DirAC) are, therefore, adapted to modify, for each instant k and each frequency bin n, the corresponding downmix value W(k,n) to $W_{mod}$(k,n), the corresponding direction-of-arrival parameter value e(k,n) to $e_{mod}$(k,n) (in FIGS. 1 to 3 represented by ϕ, respectively $ϕ_{mod}$) and/or diffuseness parameter value ψ(k,n) to $ψ_{mod}$(k,n).

The spatial audio signal modification unit comprises or is formed by, for example, the parameter modification unit 301 and the downmix modification unit 302. According to an embodiment, the parameter modification unit 301 is adapted to process the original parameter 114a to determine the modified directional parameter 214a, to process the diffuseness parameter ψ depending on the original directional parameter ϕ, respectively 114a, to split the downmix signal 112 using equations (2) and (3) using the original diffuseness parameter ψ, respectively 114b, and to apply the direction dependent filtering $H_1$(k,n,ϕ,d) and $H_2$(k,n,ϕ,d) dependent on the original directional parameter ϕ, respectively 114a. As explained previously, these modifications are performed for each time instant k and each frequency bin n to obtain, for each time instant k and each frequency instant n, the respective modified signals and/or parameters.

According to one embodiment, the apparatus 300 is adapted to only modify the first directional parameter 114a of the first parametric spatial audio signal to obtain a second directional parameter 214a of the second parametric spatial audio signal depending on the control signal 402, for example, a rotation control signal or a zoom control signal. In case the change of the listening position/orientation only comprises a rotation and no translation or zoom, a corresponding modification or shift of the directional parameter ϕ(k,n) 114a is sufficient. The corresponding diffuseness parameters and downmix signal components can be left unamended so that the second downmix signal 212 corresponds to the first downmix signal 112 and the second diffuseness parameter 214b corresponds to the first diffuseness parameter 114b.

In case of a translational change, for example a zoom, is performed, a modification of the directional parameter ϕ(k,n) 114a according to a remapping function as shown in FIG. 5A already improves the sound experience and provides for a better synchronization between the audio signal and, for example, a video signal compared to the unmodified or original parametric spatial audio signal (without modifying the diffuseness parameter or the downmix signal).

The above two embodiments which only comprise adapting or remapping the direction-of-arrival by the filter $f_p$ already provide a good impression of the zooming effect.

According to another embodiment, the apparatus 300 is adapted to only apply filter $H_1$(k,n,ϕ,d). In other words, this embodiment does not perform direction-of-arrival remapping or diffuseness modification. This embodiment is adapted to only determine, for example, the direct component 112a from the downmix signal 112 and to apply the filter function $H_1$ to the direct component to produce a direction dependent weighted version of the direct component. Such embodiments may be further adapted to use the direction dependent weighted version of the direct component as modified downmix signal $W_{mod}$ 212, or to also determine the diffuse component 112b from the original downmix signal W 112 and to generate the modified downmix signal $W_{mod}$ 212 by adding, or in general combining, the direction dependent weighted version of the direct component and the original or unaltered diffuse component 112b. An improved impression of the acoustic zooming can be achieved, however, the zoom effect is limited because the direction-of-arrival is not modified.

In an even further embodiment, the filters $H_1$(k,n,ϕ,d) and $H_2$(k,n,ϕ,d) are both applied, however, no direction-of-arrival remapping or diffuseness modification is performed. The acoustic impression is improved compared to the unamended or original parametric spatial audio signal 112, 114. The zooming impression is also better than only applying filter function $H_1$(k,n,ϕ,d) to the direct component when diffuse sound is present, however, is still limited, because the direction-of-arrival ϕ is not modified (better than the aforementioned embodiment using only $H_1$(k,n,ϕ,d).

In an even further embodiment, only the filter $f_d$ is applied, or in other words, only the diffuseness component ψ is modified. The zooming effect is improved compared to the original parametric spatial audio signal 112, 114 because the diffuseness of zoomed in areas (areas of interest) are reduced and the diffuseness values of out-of-interest are increased.

Further embodiments are adapted to perform the remapping of the direction-of-arrival ϕ by the filter function $f_p$ in combination with applying the filter $H_1$(k,n,ϕ,d) alone. In other words, such embodiments do not perform a diffuseness modification according to the filter function $f_d$ and do not apply the second filter function $H_2$(k,n,ϕ,d) to a diffuse component of the original downmix signal W 112. Such embodiments provide a very good zoom impression that is better than only applying the direction-of-arrival remapping.

Embodiments applying the direction-of-arrival remapping according to function $f_p$ in combination with a downmix modification using both filter functions $H_1$(k,n,ϕ,d) and $H_2$(k,n,ϕ,d) provide even better zoom impressions than only applying the direction-of-arrival remapping combined with applying the first filter function $H_1$ alone.

Applying the direction-of-arrival remapping according to function $f_p$, the downmix modification using filters $H_1$(k,n,ϕ,d) and $H_2$(k,n,ϕ,d), and the diffuseness medication using function $f_d$ provides the best acoustical zoom implementation.

Referring back to the embodiment remapping only the direction-of-arrival, additionally modifying the diffuseness parameter 114b further improves the audio experience or, in other words, improves the adaptation of the sound experience with regard to the changed position within the spatial audio scene. Therefore, in further embodiments, the apparatus 300 can be adapted to only modify the directional parameter ϕ(k,n) and the diffuseness parameter ϕ(k,n), but not to modify the downmix signal W(k,n) 100.

Embodiments of the apparatus 300 as mentioned above also comprise modifying the downmix signal W(k,n) to even further improve the audio experience with regard to the changed position in the spatial audio scene.

Therefore, in embodiments, wherein the first directional parameter ϕ(k,n) 114a is a vector, the parameter modification unit 301 is adapted to shift or modify the first directional parameter by an angle defined by a rotation control signal in a reverse direction to a direction defined by the rotation control signal to obtain the second directional parameter $\phi_{mod}(k, n)$ 214a.

In further embodiments, the parameter modification unit 301 is adapted to obtain the second directional parameter 214a using a non-linear mapping function (as, for example, shown in FIG. 5A) defining the second directional parameter 214a depending on the first directional parameter $\phi(k,n)$ and a zoom factor d defined by a zoom control signal 402 or another translational control information defined by the change signal.

As described above, in further embodiments, the parameter modification unit 301 can be adapted to modify the first diffuseness parameter $\psi(k,n)$ 114b of the first parametric spatial audio signal to obtain a second diffuseness parameter $\psi_{mod}(k,n)$ 214b depending on the first directional parameter $\phi(k,n)$ 114a. The parameter modification unit can be further adapted to obtain the second diffuseness parameter $\psi_{mod}(k,n)$ using a direction dependent function adapted to decrease the first diffuseness parameter $\psi(k,n)$ to obtain the second diffuseness parameter $\psi_{mod}(k,n)$ in case the first directional parameter $\phi(k,n)$ is within a predetermined central range, for example $\gamma=+/-30°$ of the original reference orientation (see FIG. 5B), and/or to increase the first diffuseness parameter $\psi(k,n)$ to obtain the second diffuseness parameter $\psi_{mod}(k,n)$ in case the first directional parameter $\phi(k,n)$ is outside of the predetermined central range, for example, in a two-dimensional case outside the central range defined by $+\gamma=+30°$ and $-\gamma=-30°$ from the 0° original reference orientation.

In other words, in certain embodiments the parameter modification unit 301, 310b is adapted to obtain the second diffuseness parameter 214b using a direction dependent function adapted to decrease the first diffuseness parameter 114b to obtain the second diffuseness parameter 214b in case the first directional parameter 114a is within a predetermined central range of the second directional parameter with the second or changed listening orientation forming the center of the predetermined two-dimensional or three-dimensional central range and/or to increase the first diffuseness parameter 114b to obtain the second diffuseness parameter in case the first directional parameter 114a is outside of the predetermined central range. The first or original listening orientation defines a center, e.g. 0°, of the predetermined central range of the first directional parameter, wherein a positive and a negative border of the predetermined central range is defined by a positive and a negative angle γ in a two-dimensional (e.g. horizontal) plane (e.g.)+/−30° independent of whether the second listening orientation is a two-dimensional or a three-dimensional vector, or by a corresponding angle γ (e.g. 30°) defining a right circular cone around the three-dimensional first listening orientation. Further embodiments can comprise different predetermined central regions or windows, symmetric and asymmetric, arranged or centered around the first listening orientation or a vector defining the first listening orientation.

In further embodiments, the direction-dependent function $f_d(k,n,\phi,d)$ depends on the change signal, for example, the zoom control signal, wherein the predetermined central range, respectively the values γ defining the negative and positive border (or in general the border) of the central range is the smaller the greater the translational change or the higher the zoom factor d defined by the zoom control signal is.

In further embodiments, the spatial audio signal modification unit comprises a downmix modification unit 302 adapted to modify the first downmix audio signal $W(k,n)$ of the first parametric spatial audio signal to obtain a second downmix signal $W_{mod}(k,n)$ of the second parametric spatial audio signal depending on the first directional parameter $\phi(k,n)$ and the first diffuseness parameter $\psi(k,n)$. Embodiments of the downmix modification unit 302 can be adapted to split the first downmix audio signal W into a direct component $S(k,n)$ 112a and a diffuse component $N(k,n)$ 112b dependent on the first diffuseness parameter $\psi(k,n)$, for example, based on equations (2) and (3).

In further embodiments, the downmix modification unit 302 is adapted to apply a first direction dependent function $H_1(k,n,\phi,d)$ to obtain a direction dependent weighted version of the direct component and/or to apply a second direction dependent function $H_2(k,n,\phi,d)$ to the diffuse component to obtain a direction-dependent weighted version of the diffuse component. The downmix modification unit 302 can be adapted to produce the direction dependent weighted version of the direct component 112a by applying a further direction dependent function $H_1(k,n,\phi,d)$ to the direct component, the further direction dependent function being adapted to increase the direct component 112a in case the first directional parameter 114a is within the further predetermined central range of the first directional parameters and/or to decrease the direct component 112a in case the first directional parameter 114a is outside of the further predetermined range of the second directional parameters. In even further embodiments the downmix modification unit can be adapted to produce the direction dependent weighted version of the diffuse component 112b by applying a direction dependent function $H_2(k,n,\phi,d)$ to the diffuse component 112b, the direction dependent function being adapted to decrease the diffuse component in case the first directional parameter 114a is within a predetermined central range of the first directional parameters and/or to increase the diffuseness component 112b in case the first directional parameter 114a is outside of the predetermined range of the second directional parameters.

In other embodiments, the downmix modification unit 302 is adapted to obtain the second downmix signal 212 based on a combination, e.g. a sum, of a direction dependent weighted version of the direct component 112a and a direction dependent weighted version of the diffuse component 112b. However, further embodiments may apply other algorithms than summing the two components to obtain the modified downmix signal 212.

As explained previously, embodiments of the downmix modification unit 302 can be adapted to split up the downmix signal W into a diffuse part or component 112b and a non-diffuse or direct part or component 112a by two multiplicators, namely $(\psi)^{1/2}$ and $(1-\psi)^{1/2}$ and to filter the non-diffuse part 112a by filter function $H_1$ and to filter the diffuse part 112b by filter function $H_2$. The filter function $H_1$ or $H_1(k,n,\phi,d)$ can be dependent on the time/frequency indices k, n, the original direction-of-arrival $\phi$ and the zoom parameter d. The filter function $H_1$ may be additionally dependent on the diffuseness $\psi$. The filter function $H_2$ or $H_2(k,n,\phi,d)$ can be dependent on the time/frequency indices k, n, the original direction-of-arrival $\phi$, and the zoom parameter d. The filter function $H_2$ may be additionally dependent on the diffuseness $\psi$. As was described previously, the filter function $H_2$ can be implemented as a subcardioid window as shown in FIG. 7, or as a simple attenuation factor, independent of the direction-of-arrival $\phi$.

Referring to the above explanations, the zoom parameter d can be used to control the filters $H_1$, $H_2$ and the modifiers or functions $f_d$ and $f_p$ (see FIG. 3A). For the filter function $H_1$ and $f_d$ the zoom parameter d can also control the look width or angular width γ (also referred to as border angle γ) of the applied windows or central regions. The width γ is defined, e.g. as the angle at which the filter function has 0 dB (see e.g. the 0 dB line in FIG. 6). The angular width γ and/or the gain can be controlled by the zoom parameter d. An example of different values for γ and different maximum gains and minimum gains is given in FIG. 6.

While embodiments of the apparatus have been described above, wherein the direction dependent functions and weighting depend on the first or original directional parameter φ (see FIG. 3A), other embodiments can be adapted to determine the second or modified diffuseness $\psi_{mod}$ and/or one or both of the filter functions $H_1$ and $H_2$ dependent on the second or modified directional parameter $\phi_{mod}$. As can be determined from FIG. 4, where α corresponds to the original directional parameter φ and β corresponds to the modified directional parameter $\phi_{mod}$ (for zoom-in), the higher zoom factor d, the more object B moves from a central or frontal position to a side position, or even (in case of even higher zoom factors d than shown in FIG. 4) to a position in the back of the virtually modified position. In other words, the higher the zoom factor d, the more the magnitude of an initially small angle representing a position in a frontal area of the listener increases, wherein higher angles represent positions in a side area of the listener. This modification of the directional parameter is taken into account by applying a function as shown in FIG. 5A. In addition, the direction dependent windows or functions for the other parameters and for the direct and diffuse components can also be designed to take into account the modification of the original directional parameter or angle, by reducing the angular width γ with increasing zoom d, for example in a non-linear manner corresponding to the direction-of-arrival or directional parameter mapping as shown in FIG. 5A. Therefore, these direction dependent windows or functions can be adapted such that the original directional parameter can be directly used (e.g. without prior modification by function $f_p$), or alternatively, first the directional parameter mapping $f_p$ is performed and afterwards the direction dependent weighting $f_d$, $H_1$ and/or $H_2$ based on the modified directional parameter is performed in a similar manner. Referring to FIG. 4 again, thus, both is possible, directional dependent functions $f_d$, $H_1$ and $H_2$ referring directly to α, representing the original directional parameter (for zoom-in), or directional dependent functions $f_d$, $H_1$ and $H_2$ referring to β representing the modified directional parameter.

Embodiments using the modified directional parameter can employ, similar to the embodiments using the original directional parameter, different windows with different angular widths and/or different gains for different zoom factors, or, the same windows with the same angular width (because the directional parameter has already been mapped to reflect the different zoom factors) and the same gain, or windows with the same angular widths but different gains, wherein a higher zoom factor results in a higher gain (analog to the windows in FIG. 6).

Figure 3B:
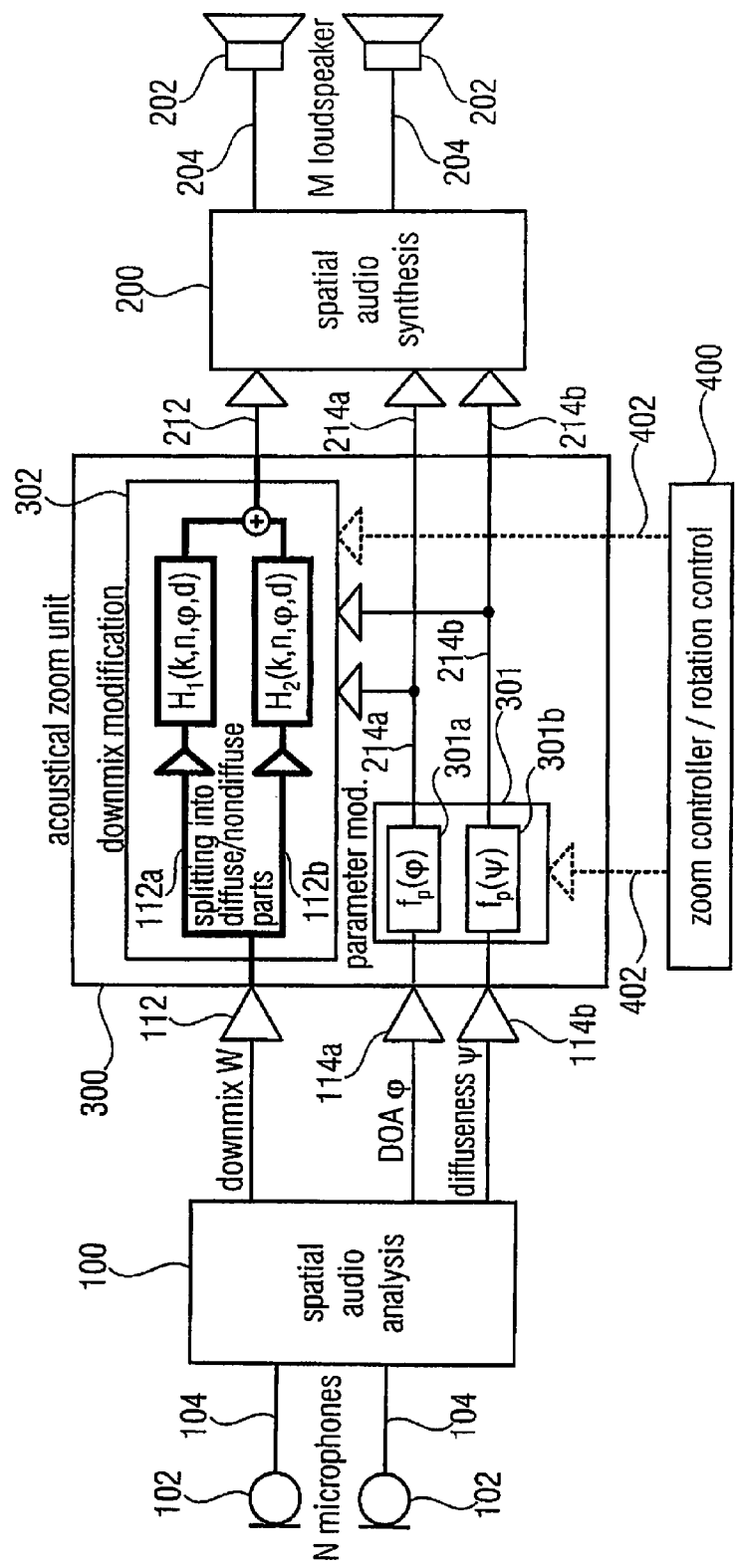
FIG. 3B corresponds to FIG. 2 and shows a further more detailed embodiment of the spatial parameter modification block.

FIG. 3B shows a further embodiment of the apparatus. The spatial audio signal modification unit in FIG. 3B comprises or is formed by, for example, the parameter modification unit 301 and the downmix modification unit 302. According to an alternative embodiment, the parameter modification unit 301 is adapted to first process the original parameter 114a to determine the modified directional parameter 214a, to then process the diffuseness parameter ψ depending on the modified directional parameter $\phi_{mod}$, respectively 214a, to split the downmix signal 112 using equations (2) and (3) and the original diffuseness parameter ψ, respectively 114b as described based on FIG. 3A, and to apply the direction dependent filtering $H_1$ and $H_2$ dependent on the modified directional parameter $\phi_{mod}$, respectively 214a. As explained previously, these modifications are performed for each time instant k and each frequency bin n to obtain, for each time instant k and each frequency instant n, the respective modified signals and/or parameters.

According to another alternative embodiment of the apparatus 300 according to FIG. 3B, the parameter modification unit 301 is adapted to process the original parameter 114a to determine the modified directional parameter 214a, to process the diffuseness parameter ψ depending on the original directional parameter φ or 114a, to determine the modified diffuseness parameter $\psi_{mod}$ or 214b, to split the downmix signal 112 using equations (2) and (3) and the original diffuseness parameter ψ or 114b as described based on FIG. 3A, and to apply the direction dependent filtering $H_1$ and $H_2$ dependent on the modified directional parameter $\phi_{mod}$, or 214a.

According to one embodiment, the apparatus 300 according to FIG. 3B is adapted to only modify the first directional parameter 114a of the first parametric spatial audio signal to obtain a second directional parameter 214a of the second parametric spatial audio signal depending on the control signal 402, for example, a rotation control signal or a zoom control signal. In case the change of the listening position/orientation only comprises a rotation and no translation or zoom, a corresponding modification or shift of the directional parameter φ(k,n) 114a is sufficient. The corresponding diffuseness parameters and downmix signal components can be left un-amended so that the second downmix signal 212 corresponds to the first downmix signal 112 and the second diffuseness parameter 214b corresponds to the first diffuseness parameter 114b.

In case of a translational change, for example a zoom, is performed, a modification of the directional parameter φ(k,n) 114a according to a remapping function as shown in FIG. 5A already improves the sound experience and provides for a better synchronization between the audio signal and, for example, a video signal compared to the unmodified or original parametric spatial audio signal (without modifying the diffuseness parameter or the downmix signal).

Modifying the diffuseness parameter 114b further improves the audio experience or, in other words, improves the adaptation of the sound experience with regard to the changed position within the spatial audio scene. Therefore, in further embodiments, the apparatus 300 can be adapted to only modify the directional parameter φ(k,n) and the diffuseness parameter ψ(k,n), the latter dependent on the modified directional parameter $\phi_{mod}$(k,n), but not to modify the downmix signal W(k,n) 100.

Embodiments of the apparatus 300 according to FIG. 3B also comprise modifying the downmix signal W(k,n) dependent on the original diffuseness ψ(k,n) and the modified directional parameter $\phi_{mod}$(k,n) to even further improve the audio experience with regard to the changed position in the spatial audio scene.

Therefore, in embodiments, wherein the first directional parameter φ(k,n) 114a is a vector, the parameter modification unit 301 is adapted to shift or modify the first directional parameter by an angle defined by a rotation control signal in a reverse direction to a direction defined by the rotation control signal to obtain the second directional parameter $\phi_{mod}$(k, n) 214a.

In further embodiments, the parameter modification unit 301 is adapted to obtain the second directional parameter 214a using a non-linear mapping function (as, for example, shown in FIG. 5A) defining the second directional parameter

214a depending on the first directional parameter φ(k,n) and a zoom factor d defined by a zoom control signal 402 or another translational control information defined by the change signal.

As described above, in further embodiments, the parameter modification unit 301 can be adapted to modify the first diffuseness parameter ψ(k,n) 114b of the first parametric spatial audio signal to obtain a second diffuseness parameter ψ$_{mod}$(k,n) 214b depending on the second directional parameter φ$_{mod}$(k,n) 214a. The parameter modification unit can be further adapted to obtain the second diffuseness parameter φ$_{mod}$(k,n) using a direction dependent function adapted to decrease the first diffuseness parameter φ(k,n) to obtain the second diffuseness parameter φ$_{mod}$(k,n) in case the second directional parameter φ$_d$(k,n) is within a predetermined central range, for example +/−30° of the original reference orientation referred to as original 0° orientation, and/or to increase the first diffuseness parameter ψ(k,n) to obtain the second diffuseness parameter ψ$_{mod}$(k,n) in case the second directional parameter γ$_{mod}$(k,n) is outside of the predetermined central range, for example, in a two-dimensional case outside the central range defined by +30° and −30° from the 0° original reference orientation.

In other words, in certain embodiments the parameter modification unit 301, 310b is adapted to obtain the second diffuseness parameter 214b using a direction dependent function adapted to decrease the first diffuseness parameter 114b to obtain the second diffuseness parameter 214b in case the second directional parameter 214a is within a predetermined central range of the second directional parameter with the first or original listening orientation forming the center of the predetermined two-dimensional or three-dimensional central range and/or to increase the first diffuseness parameter 114b to obtain the second diffuseness parameter in case the second directional parameter 214a is outside of the predetermined central range. The first listening orientation defines a center, e.g. 0°, of the predetermined central range of the second directional parameter, wherein a positive and a negative border of the predetermined central range is defined by a positive and a negative angle in a two-dimensional (e.g. horizontal) plane (e.g.)+/−30° independent of whether the first listening orientation is a two-dimensional or a three-dimensional vector, or by a corresponding angle (e.g. 30°) defining a right circular cone around the three-dimensional second listening orientation. Further embodiments can comprise different predetermined central regions, symmetric and asymmetric, arranged around the first listening orientation or vector defining the first listening orientation.

In further embodiments, the direction-dependent function f$_d$(ψ) depends on the change signal, for example, the zoom control signal, wherein the predetermined central range, respectively the values defining the negative and positive border (or in general the border) of the central range is the smaller the greater the translational change or the higher the zoom factor defined by the zoom control signal is.

In further embodiments, the spatial audio signal modification unit comprises a downmix modification unit 302 adapted to modify the first downmix audio signal W(k,n) of the first parametric spatial audio signal to obtain a second downmix signal W$_{mod}$(k,n) of the second parametric spatial audio signal depending on the second directional parameter φ$_{mod}$(k,n) and the first diffuseness parameter ψ(k,n). Embodiments of the downmix modification unit 302 can be adapted to split the first downmix audio signal W into a direct component S(k,n) 112a and a diffuse component N(k,n) 112b dependent on the first diffuseness parameter ψ(k,n), for example, based on equations (2) and (3).

In further embodiments, the downmix modification unit 302 is adapted to apply a first direction dependent function H$_1$ to obtain a direction dependent weighted version of the direct component and/or to apply a second direction dependent function H$_2$ to the diffuse component to obtain a direction-dependent weighted version of the diffuse component. The downmix modification unit 302 can be adapted to produce the direction dependent weighted version of the direct component 112a by applying a further direction dependent function H$_1$ to the direct component, the further direction dependent function being adapted to increase the direct component 112a in case the second directional parameter 214a is within the further predetermined central range of the second directional parameters and/or to decrease the direct component 112a in case the second directional parameter 214a is outside of the further predetermined range of the second directional parameters. In even further embodiments the downmix modification unit can be adapted to produce the direction dependent weighted version of the diffuse component 112b by applying a direction dependent function H$_2$ to the diffuse component 112b, the direction dependent function being adapted to decrease the diffuse component in case the second directional parameter 214a is within a predetermined central range of the second directional parameters and/or to increase the diffuse component 112b in case the second directional parameter 214a is outside of the predetermined range of the second directional parameters.

In other embodiments, the downmix modification unit 302 is adapted to obtain the second downmix signal 212 based on a combination, e.g. a sum, of a direction dependent weighted version of the direct component 112a and a direction dependent weighted version of the diffuse component 112b. However, further embodiments may apply other algorithms than summing the two components to obtain the modified downmix signal 212.

As explained previously, embodiments of the downmix modification unit 302 according to FIG. 3B can be adapted to split up the downmix signal W into a diffuse part or component 112b and a non-diffuse or direct part or component 112a by two multiplicators, namely $(\psi)^{1/2}$ and $(1-\psi)^{1/2}$ and to filter the non-diffuse part 112a by filter function H$_1$ and to filter the diffuse part 112b by filter function H$_2$. The filter function H$_1$ or H$_1$(φ,ψ) can be dependent on the time/frequency indices k, n, the modified direction-of-arrival and the zoom parameter d. The filter function H$_1$ may be additionally dependent on the diffuseness ψ. The filter function H$_2$ or H$_2$(φ,ψ) can be dependent on the time/frequency indices k, n, the original direction-of-arrival φ, and the zoom parameter d. The filter function H$_2$ or H$_2$(φ,ψ) may be additionally dependent on the diffuseness w. As was described previously, the filter function H$_2$ can be implemented as a subcardioid window as shown in FIG. 7, or as a simple attenuation factor, independent of the modified direction-of-arrival φ$_{mod}$.

Referring to the above explanations, also in embodiments according to FIG. 3B, the zoom parameters d can be used to control the filters H$_1$, H$_2$ and the modifiers or functions f$_d$ and f$_p$. For the filter functions H1 and fd the zoom parameter d can also control the angular width γ (also referred to as border angle γ) of the applied windows or central regions. The width γ is defined, e.g. as the angle at which the filter function has 0 dB (analog to the 0 dB line in FIG. 6). The angular width γ and/or the gain can be controlled by the zoom parameter d. It should be noted that in general, the explanations given with regard to the embodiments according to FIG. 3A apply in the same manner or at least in an analog manner to embodiments according to FIG. 3B.

In the following, exemplary applications are described where the inventive embodiments lead to an improved experience of a joint video/audio playback by adjusting the perceived audio image to the zoom control of a video camera.

In teleconferencing, it is state-of-the-art to automatically steer the camera towards the active speaker. This is usually connected with zooming closer to the talker. The sound is traditionally not matched to the picture. Embodiments of the present invention provide the possibility of also zooming-in on the active talker acoustically. This was the overall impression is more realistic for the far-end users, as not only the picture is changed in its focus, but the sound matches the desired change of attention. In short, the acoustical cues correspond to the visual cues.

Modern camcorders, for example, for home entertainment, are capable of recording surround sound and have a powerful optical zoom. There is, however, no perceptual equivalent interaction between the optical zoom and the recorded sound, as the recorded spatial sound only depends on the actual position of the camera and, thus, the position of the microphones mounted on the camera itself. In case of a scene filmed in a close-up mode, the invention allows to adjust the audio image accordingly. This leads to a more natural and consistent consumer experience as the sound is zoomed together with the picture.

It should be mentioned that the invention may also be applied in a post-processing phase if the original microphone signals are recorded unaltered with the video and no further processing has been done. Although the original zoom length may not be known, the invention can be used in creative audio-visual post-processing toolboxes. An arbitrary zoom-length can be selected and the acoustical zoom can be steered by the user to match the picture. Alternatively, the user can create his own advantageous spatial effects. In either case, the original microphone recording position will be altered to a user defined virtual recording position.

Depending on certain implementation requirements of the inventive methods, the inventive methods can be implemented in hardware or in software. The implementation can be performed using a digital storage medium, in particular, a disc, a CD, a DVD or a Blu-Ray disc having an electronically-readable control signal stored thereon, which cooperates with a programmable computer system such that an embodiment of the inventive method is performed. Generally, an embodiment of the present invention is, therefore, a computer program produced with a program code stored on a machine-readable carrier, the program code being operative for performing the inventive method when the computer program product runs on a computer. In other words, embodiments of the inventive method are, therefore, a computer program having a program code for performing at least one of the inventive methods when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for converting a first parametric spatial audio signal representing a first listening position or a first listening orientation in a spatial audio scene to a second parametric spatial audio signal representing a second listening position or a second listening orientation; the apparatus comprising:

a spatial audio signal modification unit adapted to modify the first parametric spatial audio signal dependent on a change of the first listening position or the first listening orientation so as to acquire the second parametric spatial audio signal, wherein the second listening position or the second listening orientation corresponds to the first listening position or the first listening orientation changed by the change;

wherein the spatial audio signal modification unit comprises a parameter modification unit adapted to modify a first directional parameter of the first parametric spatial audio signal so as to acquire a second directional parameter of the second parametric spatial audio signal depending on a control signal providing information corresponding to the change;

wherein the spatial audio signal modification unit comprises a downmix modification unit adapted to modify a first downmix audio signal of the first parametric spatial audio signal to acquire a second downmix signal of the second parametric spatial audio signal depending on the first directional parameter and/or a first diffuseness parameter, or a downmix modification unit adapted to modify the first downmix audio signal of the first parametric spatial audio signal to acquire the second downmix signal of the second parametric spatial audio signal depending on the second directional parameter and/or a first diffuseness parameter;

wherein the downmix modification unit is adapted to derive a direct component from the first downmix audio signal and a diffuse component from the first downmix audio signal dependent on the first diffuseness parameter;

wherein the downmix modification unit is adapted to acquire the second downmix signal based on a combination of a direction dependent weighted version of the direct component and a direction dependent weighted version of the diffuse component;

wherein the downmix modification unit is adapted to produce the direction dependent weighted version of the direct component by applying a first direction dependent function to the direct component, the first direction dependent function being adapted to increase the direct component in case the first directional parameter is within a predetermined central range of the first directional parameters and/or to decrease the direct component in case the first directional parameter is outside of the predetermined range of the first directional parameters; and wherein the downmix modification unit is adapted to apply a second direction-dependent function to the diffuse component to acquire the direction dependent weighted version of the diffuse component.

2. Apparatus for converting a first parametric spatial audio signal representing a first listening position or a first listening orientation in a spatial audio scene to a second parametric spatial audio signal representing a second listening position or a second listening orientation; the apparatus comprising:

a spatial audio signal modification unit adapted to modify the first parametric spatial audio signal dependent on a change of the first listening position or the first listening orientation so as to acquire the second parametric spatial audio signal, wherein the second listening position or the second listening orientation corresponds to the first listening position or the first listening orientation changed by the change;

wherein the spatial audio signal modification unit comprises a parameter modification unit adapted to modify a first directional parameter of the first parametric spatial audio signal so as to acquire a second directional parameter of the second parametric spatial audio signal depending on a control signal providing information corresponding to the change;

wherein the parameter modification unit is adapted to modify a first diffuseness parameter of the first parametric spatial audio signal so as to acquire a second diffuseness parameter of the second parametric spatial audio signal depending on the first directional parameter or depending on the second directional parameter.

3. A method for converting a first parametric spatial audio signal representing a first listening position or a first listening orientation in a spatial audio scene to a second parametric spatial audio signal representing a second listening position or a second listening orientation, the method comprising:

with a spatial audio signal modification unit, comprising a parameter modification unit and a downmix modification unit, modifying the first parametric spatial audio signal dependent on a change of the first listening position or the first listening orientation so as to acquire the second parametric spatial audio signal, wherein the second listening position or the second listening orientation corresponds to the first listening position or the first listening orientation changed by the change;

with the parameter modification unit, modifying a first directional parameter of the first parametric spatial audio signal so as to acquire a second directional parameter of the second parametric spatial audio signal depending on a control signal providing information corresponding to the change; and with the downmix modification unit,
modifying a first downmix audio signal of the first parametric spatial audio signal to acquire a second downmix signal of the second parametric spatial audio signal depending on the first directional parameter and/or a first diffuseness parameter, or modifying the first downmix audio signal of the first parametric spatial audio signal to acquire the second downmix signal of the second parametric spatial audio signal depending on the second directional parameter and/or a first diffuseness parameter;

deriving a direct component from the first downmix audio signal and a diffuse component from the first downmix audio signal dependent on the first diffuseness parameter;

acquiring the second downmix signal based on a combination of a direction dependent weighted version of the direct component and a direction dependent weighted version of the diffuse component;

producing the direction dependent weighted version of the direct component by applying a first direction dependent function to the direct component, the first direction dependent function being adapted to increase the direct component in case the first directional parameter is within a predetermined central range of the first directional parameters and/or to decrease the direct component in case the first directional parameter is outside of the predetermined range of the first directional parameters; and applying a second direction-dependent function to the diffuse component to acquire the direction dependent weighted version of the diffuse component.

4. A non-transitory computer-readable medium having program code stored thereon, wherein the program code, when executed by a computer associated with the spatial audio signal modification unit, performs the method according to claim 3.

5. A method for converting a first parametric spatial audio signal representing a first listening position or a first listening orientation in a spatial audio scene to a second parametric spatial audio signal representing a second listening position or a second listening orientation; the method comprising:

with a spatial audio signal modification unit, comprising a parameter modification unit, modifying the first parametric spatial audio signal dependent on a change of the first listening position or the first listening orientation so as to acquire the second parametric spatial audio signal, wherein the second listening position or the second listening orientation corresponds to the first listening position or the first listening orientation changed by the change; and with the parameter modification unit,
modifying a first directional parameter of the first parametric spatial audio signal so as to acquire a second directional parameter of the second parametric spatial audio signal depending on a control signal providing information corresponding to the change; and modifying a first diffuseness parameter of the first parametric spatial audio signal so as to acquire a second diffuseness parameter of the second parametric spatial audio signal depending on the first directional parameter or depending on the second directional parameter.

6. A non-transitory computer-readable medium having program code stored thereon, wherein the program code, when executed by a computer associated with the spatial audio signal modification unit, performs the method according to claim 5.

* * * * *